(12) United States Patent
Oukili et al.

(10) Patent No.: US 10,795,039 B2
(45) Date of Patent: Oct. 6, 2020

(54) GENERATING PSEUDO PRESSURE WAVEFIELDS UTILIZING A WARPING ATTRIBUTE

(71) Applicant: PGS Geophysical AS, Oslo (NO)

(72) Inventors: Julien Oukili, Oslo (NO); Bagher Farmani, Slependen (NO)

(73) Assignee: PGS Geophysical AS, Oslo (NO)

(*) Notice: Subject to any disclaimer, the term of this patent is extended or adjusted under 35 U.S.C. 154(b) by 363 days.

(21) Appl. No.: 15/834,932

(22) Filed: Dec. 7, 2017

(65) Prior Publication Data

US 2018/0164452 A1 Jun. 14, 2018

Related U.S. Application Data

(60) Provisional application No. 62/434,004, filed on Dec. 14, 2016.

(51) Int. Cl.
| | |
|---|---|
| *G01V 1/36* | (2006.01) |
| *G01V 1/24* | (2006.01) |
| *G01V 1/16* | (2006.01) |
| *G01V 1/20* | (2006.01) |
| *G01V 1/38* | (2006.01) |
| *G01V 1/053* | (2006.01) |

(52) U.S. Cl.
CPC ............ *G01V 1/247* (2013.01); *G01V 1/16* (2013.01); *G01V 1/164* (2013.01); *G01V 1/20* (2013.01); *G01V 1/201* (2013.01); *G01V 1/24* (2013.01); *G01V 1/362* (2013.01); *G01V 1/38* (2013.01); *G01V 1/053* (2013.01); *G01V 2210/1423* (2013.01); *G01V 2210/532* (2013.01)

(58) Field of Classification Search
CPC .......... G01V 1/247; G01V 1/16; G01V 1/164; G01V 1/20; G01V 1/201; G01V 1/24; G01V 1/362; G01V 1/38; G01V 1/053; G01V 2210/1423; G01V 2210/532
See application file for complete search history.

(56) References Cited

U.S. PATENT DOCUMENTS

| | | | |
|---|---|---|---|
| 6,836,448 B2 | 12/2004 | Robertsson et al. | |
| 8,339,896 B2 | 12/2012 | van Borselen et al. | |
| 8,811,113 B2* | 8/2014 | Barr, Jr. ................. | G01V 1/364 367/24 |
| 9,234,977 B2* | 1/2016 | Ferber .................... | G01V 1/364 |
| 10,107,929 B2* | 10/2018 | Kluever .................... | G01V 1/36 |
| 10,422,898 B2* | 9/2019 | Ferber ...................... | G01V 1/28 |
| 2008/0275649 A1 | 11/2008 | Ozdemir et al. | |
| 2010/0139927 A1 | 6/2010 | Bakulin et al. | |
| 2010/0161235 A1 | 6/2010 | Ikelle | |
| 2015/0301210 A1 | 10/2015 | Asgedom et al. | |
| 2017/0248721 A1* | 8/2017 | Poole ....................... | G01V 1/36 |
| 2019/0257966 A1* | 8/2019 | Cecconello ............. | G01V 1/366 |

* cited by examiner

*Primary Examiner* — Krystine E Breier

(57) ABSTRACT

Techniques are disclosed relating to the determination of a warping attribute related to a difference between an up-going pressure wavefield and a down-going pressure wavefield received from a seismic data acquisition system. The warping attribute is used to determine a pseudo up-going or down-going pressure wavefield. The pseudo pressure wavefield is used to generate a modified record of geophysical data, which is stored in a non-transitory memory medium as a geophysical data product.

21 Claims, 18 Drawing Sheets

GENERATING PSEUDO PRESSURE WAVEFIELDS UTILIZING A WARPING ATTRIBUTE

PRIORITY CLAIM

This application claims priority to U.S. provisional patent application Ser. No. 62/434,004, entitled "Wavefield Generation," filed Dec. 14, 2016, which is hereby incorporated by reference in its entirety as though fully and completely set forth herein.

BACKGROUND

Technical Field

This disclosure relates generally to the field of seismic data analysis.

Description of the Related Art

In recent years, the petroleum industry has invested heavily in the development of improved marine survey techniques and seismic analysis methods in order to increase the resolution and accuracy of seismic images of subterranean formations. Marine surveys illuminate a subterranean formation located beneath a body of water with acoustic signals produced by one or more submerged seismic sources. The acoustic signals travel down through the water and into the subterranean formation. At each interface between different types of rock or sediment of the subterranean formation a portion of the acoustic signal energy is refracted (i.e., a portion is transmitted), and a portion is reflected back toward the formation surface and into the body of water. A typical marine survey is carried out with a survey vessel that passes over the illuminated subterranean formation while towing elongated cable-like structures called streamers. The streamers may be equipped with a number of collocated, dual pressure and particle motion sensors that detect pressure and vertical particle motion wavefields, respectively, associated with the acoustic signals reflected back into the water from the subterranean formation. The pressure sensors generate seismic data that represents the pressure wavefield and the particle motion sensors generate seismic data that represents the vertical particle motion wavefield. The survey vessel may receive and record the seismic data generated by the sensors.

A wavefield that travels upward from the subterranean formation and is detected by the pressure or particle motion sensors is called an up-going wavefield, which alone may be used to compute a seismic image of the subterranean formation. However, the surface of the water acts as a nearly perfect acoustic reflector. As a result, the sensors also detect a down-going wavefield created by reflection of the up-going wavefield from the water surface. The down-going wavefield is essentially the up-going wavefield with a time delay that corresponds to the amount of time it takes for acoustic signals to travel up past the streamers to the water surface and back down to the streamers. The down-going wavefield combines with the up-going wavefield, resulting in recorded seismic data contaminated with unwanted down-going wavefield energy that creates "ghost" effects in seismic images of the subterranean formation computed from the seismic data. Typical seismic analysis techniques use both the pressure wavefield and vertical particle motion wavefield to separate the pressure and vertical particle motion wavefields into up-going and down-going wavefields. The up-going wavefield may be used to compute an image of a subterranean formation without the ghost effects caused by the down-going wavefield. However, standard techniques for imaging subterranean formations are computationally expensive and time consuming. Improvements in the field are therefore desirable.

Figure 1A:
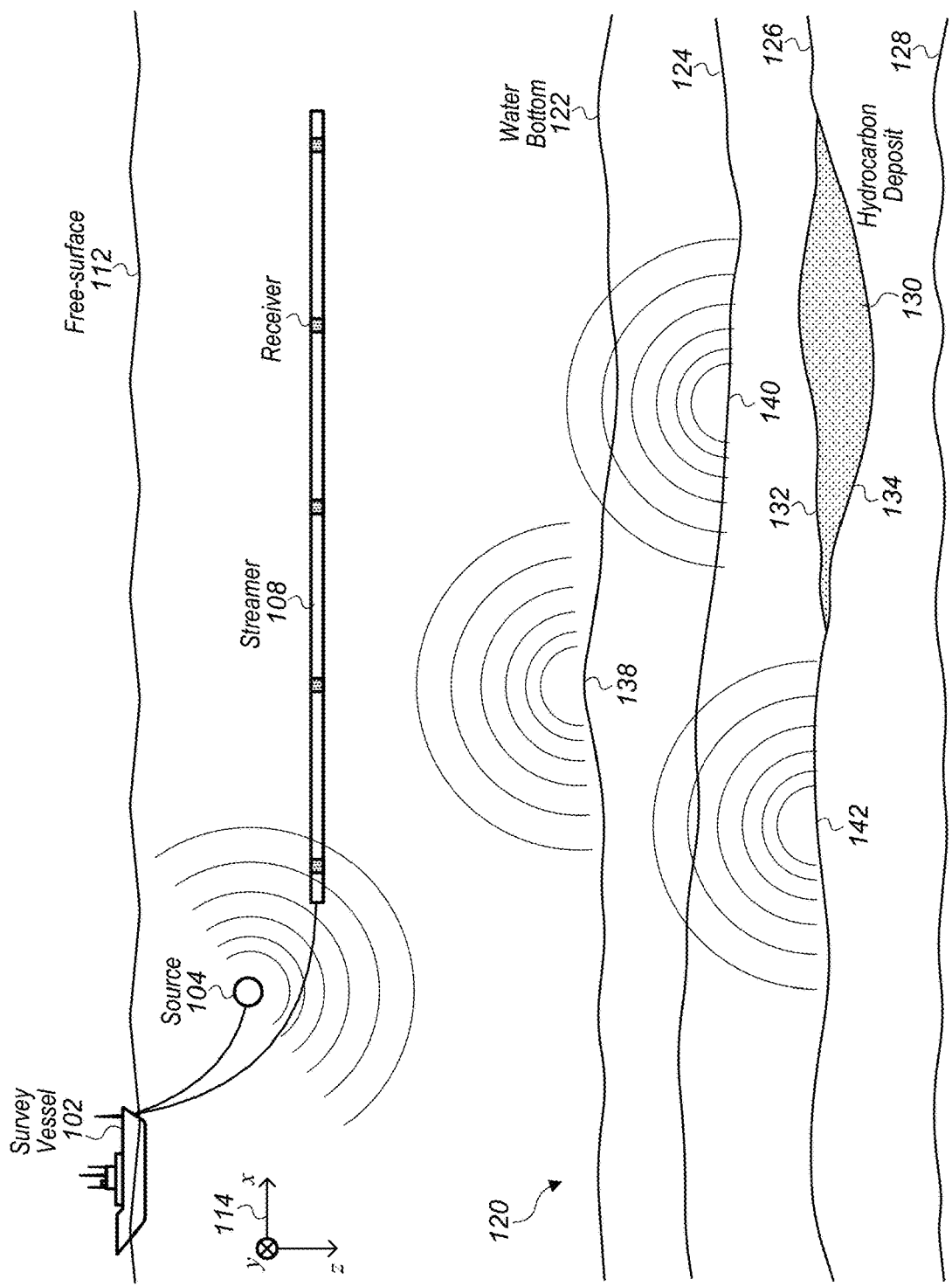
FIGS. 1A-1B are side-view and top-view illustrations, respectively, of an example seismic data acquisition system, according to some embodiments.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure, including the appended claims. Particular features, structures, or characteristics may be combined in any suitable manner consistent with this disclosure.

It is to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," "comprise," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "mobile device configured to generate a hash value" is intended to cover, for example, a mobile device that performs this function during operation, even if the device in question is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, only those claims in this application using the "means for" construct are intended to be interpreted as having means-plus-function elements.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

The calculation of up-going and down-going wavefields may be complicated by the fact that in many environments the sea surface is not entirely flat, but rather the sea surface (or "sea-state") is characterized by wave deformations (i.e., swells) that vary in space and time. Existing implementations attempt to accommodate for a non-uniform sea-state by performing extensive calculations to compute an estimate of the sea state from the measured pressure and vertical particle motion wavefields. Calculating a sea-state estimate is typically a very computationally intensive task that may require significant computational time and resources. Embodiments described herein derive a warping attribute to characterize the effect of a non-uniform sea state on the up-going and down-going wavefields, without explicitly calculating a sea-state model, which may advantageously reduce the computational burden associated with existing techniques.

Figure 1B:
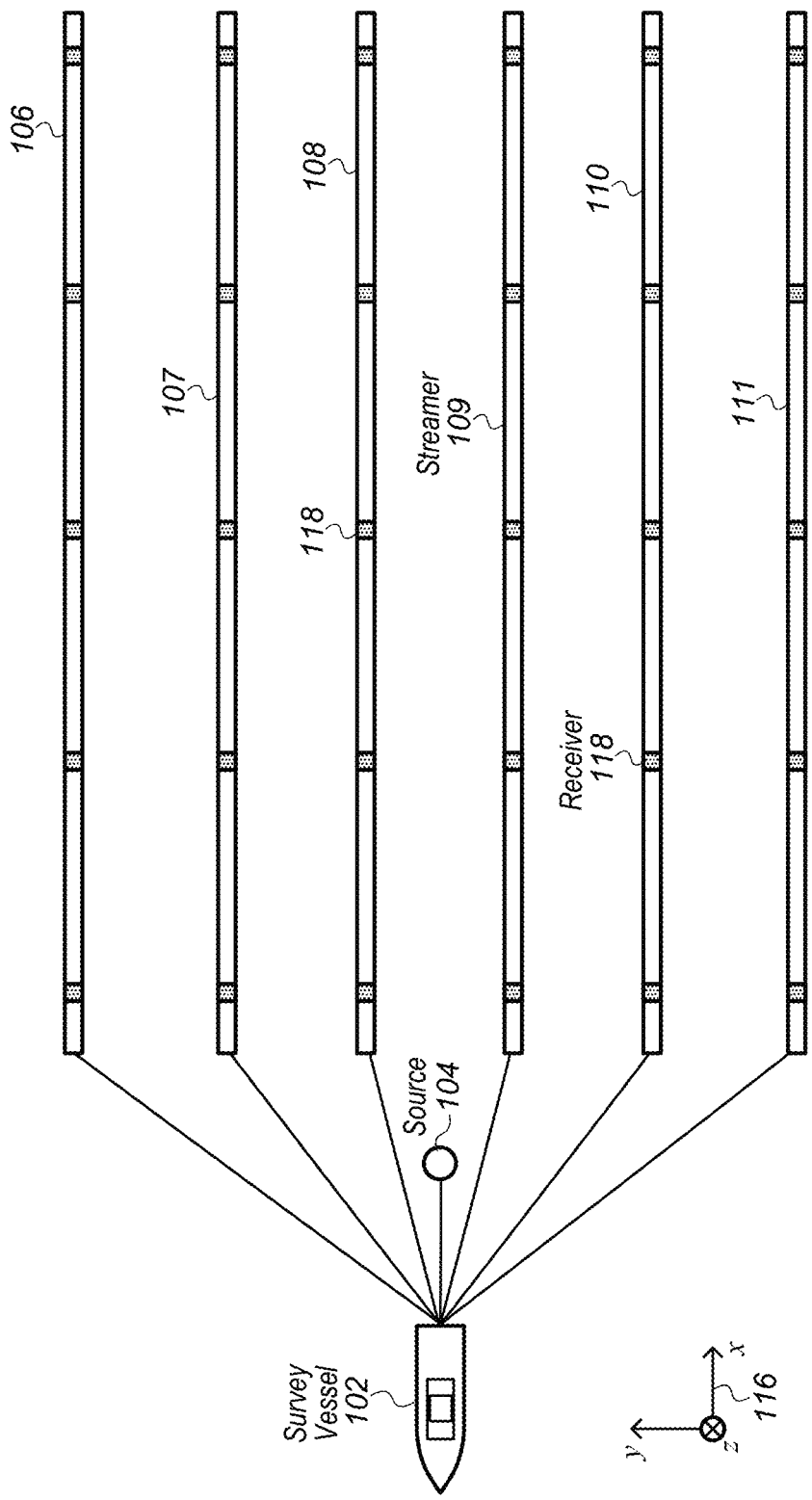

FIGS. 1A-1B—Example Seismic Data Acquisition System

FIGS. 1A-1B show side-elevation and top views, respectively, of an example seismic data acquisition system composed of a survey vessel 102 towing a source 104 and six separate streamers 106-111 beneath a free surface 112 of a body of water. The body of water may be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths such that the data acquisition surface is angled or curved with respect to the free surface 112, or one or more of the streamers may simply be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups or arrays by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers is curved) and is referred to as the "in-line" direction. They-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles 118 spaced-apart along the length of each streamer to seismic data acquisition equipment and data-storages devices located on board the survey vessel 102.

Streamer depth below the free surface 112 may be estimated at various locations along the streamers using depth measuring devices attached to the streamers. For example, the depth measuring devices can measure hydrostatic pressure or utilize acoustic distance measurements. The depth measuring devices may be integrated with depth controllers, such as paravanes or water kites that control and maintain the depth and position of the streamers as the streamers are towed through the body of water. The depth measuring devices are typically placed at intervals (e.g., about 300 meter intervals in some implementations) along each streamer. Note that in other implementations buoys may be attached to the streamers and used to help maintain the orientation and depth of the streamers below the free surface 112.

FIG. 1A shows a cross-sectional view of the survey vessel 102 towing the source 104 above a subterranean formation 120. Curve 122 represents a top surface of the subterranean formation 120 located at the bottom of the body of water. The subterranean formation 120 is composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey.

As the survey vessel 102 moves over the subterranean formation 120, the source 104 is activated to produce an acoustic signal (often referred to as a "shot") at spatial and/or temporal intervals. In other implementations, the source 104 may be towed by one survey vessel and the streamers may be towed by a different survey vessel. The source 104 may be an air gun, marine vibrator, or composed of an array of air guns and/or marine vibrators.

FIG. 1A illustrates an acoustic signal expanding outward from the source 104 as a pressure wavefield 136 represented by semicircles of increasing radius centered at the source 104. The outwardly expanding wavefronts from the sources may be spherical but are shown in vertical plane cross section in FIG. 1A. The outward and downward expanding portion of the pressure wavefield 136 is called the "primary wavefield," which eventually reaches the formation surface 122 of the subterranean formation 120, at which point the primary wavefield is partially reflected from the formation surface 122 and partially refracted downward into the subterranean formation 120, becoming elastic waves within the subterranean formation 120. In other words, in the body of water, the acoustic signal is composed of compressional pressure waves, or P-waves, while in the subterranean formation 120, the waves include both P-waves and transverse waves, or S-waves.

Within the subterranean formation 120, at each interface between different types of materials or at discontinuities in density or in one or more of various other physical characteristics or parameters, downward propagating waves are partially reflected and partially refracted. As a result, each point of the formation surface 122 and each point of the interfaces 124, 126, and 128 is a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, secondary waves of significant amplitude may be generally emitted from points on or close to the surface 122, such as point 138, and from points on or very close to interfaces in the subterranean formation 120, such as points 140 and 142. The upward expanding secondary waves emitted from the subterranean formation 120 are collectively called the "secondary wavefield."

The secondary waves that compose the secondary wavefield may be generally emitted at different times within a range of times following the initial acoustic signal. A point on the formation surface 122, such as the point 138, may receive a pressure disturbance from the primary wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are emitted from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the primary wavefield and secondary wavefield emitted in response to the primary wavefield may be functions of distance from the source 104 as well as the materials and physical characteristics of the materials through which the wavefields travel. In addition, the secondary expanding wavefronts may be altered as the wavefronts cross interfaces and as the velocity of sound varies in the media traversed by the wave. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration geophysicists.

Figure 2:
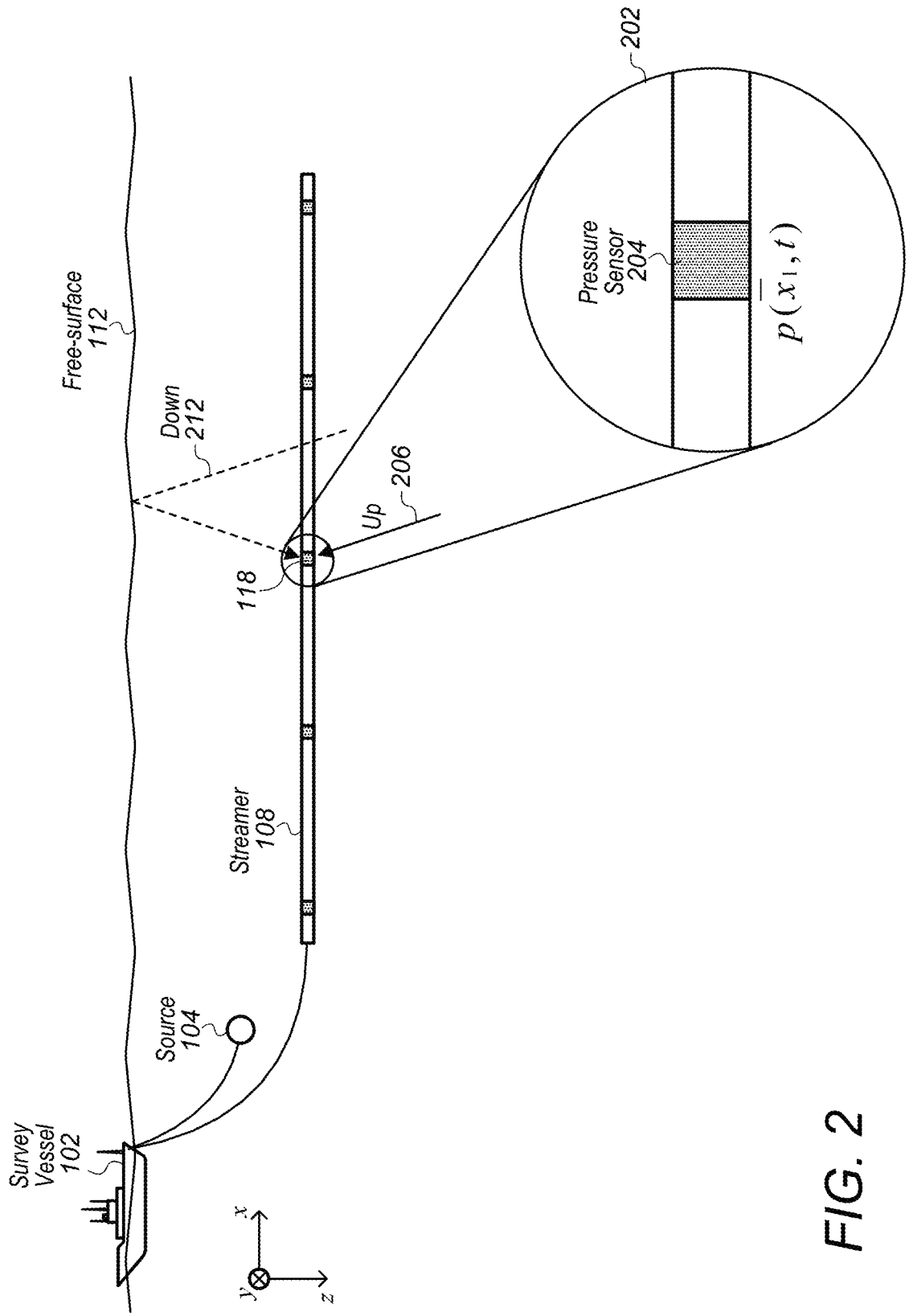
FIG. 2 is a side-view illustration of a seismic data acquisition system with a magnified view of a receiver, according to some embodiments.

FIG. 2—Side-View of Seismic Data Acquisition System and Receiver

Each receiver may include a pressure sensor that detects variations in water pressure over time. FIG. 2 shows a side-elevation view of the marine seismic data acquisition system with a magnified view 202 of the receiver 204. In this example, the magnified view 202 reveals that the receiver 204 is a pressure sensor. The pressure sensors may be, for example, hydrophones. Each pressure sensor measures non-directional, hydrostatic pressure changes over time and produces pressure data denoted by p ($\vec{x}_r$, t), where $\vec{x}_r$=($x_r$, $y_r$, $z_r$) represent the receiver Cartesian coordinates, and t represents time. The depth $z_r$ of each receiver may be estimated from the depth measurements obtained from the depth measuring devices located along the streamers.

Seismic data includes data generated by the receivers when detecting hydrostatic pressure changes over time. The streamers 106-111, receivers, and the survey vessel 102 may include sensing electronics and data-analysis facilities that allow seismic data generated by each receiver to be correlated with the time and location of each source activation, absolute positions on the free surface 112, and absolute three-dimensional positions with respect to an arbitrary three-dimensional coordinate system. The seismic data may be stored at the receivers and/or may be sent along the streamers and data transmission cables to the survey vessel 102, where the data may be stored electronically or magnetically on data-storage devices located onboard the survey vessel 102.

The seismic data generated by the receivers represents pressure changes in the secondary wavefield emitted from the subterranean formation 120 and is, therefore, called the pressure wavefield. The secondary wavefield emitted from the subterranean formation 120 propagates upward toward the free surface 112 and is called an up-going wavefield. In FIG. 2, directional arrow 206 represents the direction of an up-going wavefield at the location of receiver 208 and dashed arrows 210 and 212 represents a down-going wavefield produced by the up-going wavefield reflection from the free surface 112 before reaching the receiver 208. In other words, the pressure wavefield p ($\vec{x}_r$, t) measured by the receivers is composed of an up-going pressure wavefield component and a down-going pressure wavefield component. The down-going wavefield contaminates seismic data and creates notches in the seismic data spectral domain.

The seismic data generated by each receiver is a time series of consecutively measured values, called amplitudes, separated in time by a sample rate. The time series seismic data measured by a receiver responsive to a source activation is called a "trace," which may include thousands of time samples of amplitudes collected at a sample rate of about 1 to 5 ms. A trace is a record of a subterranean formation response to acoustic energy that passes from an activated source, into the subterranean formation where the reflected acoustic energy is detected by a receiver as described above. A trace generated by a pressure sensor is a set of time-dependent pressure amplitudes denoted by:

$$p(\vec{x}_r, t) = \{a_r(t_j)\}_{j=1}^{J} \quad (1)$$

where r is a positive integer trace, receiver, or channel index;

j is a time sample index;
J is the number of time samples; and
$a_r(t_j)$ is the pressure amplitude of the r-th trace at time sample $t_j$.

Each trace also includes a trace header, not represented in Equation (1), that identifies the specific receiver that generated the trace, receiver GPS coordinates, and may include time sample rate and the number of samples.

As explained above, the secondary wavefield typically arrives first at the receivers located closest to the sources. The distance from the sources to a receiver is called the "source-receiver offset," or simply "offset," which creates a delay in the arrival time of a secondary wavefield from a substantially horizontal interface within the subterranean formation. A larger offset generally results in a longer arrival time delay. Various sets of traces are collected to form seismic data structures called "gathers" that may be further processed using various seismic analysis techniques in order to extract information about the structure of the subterranean formation.

Figure 3:
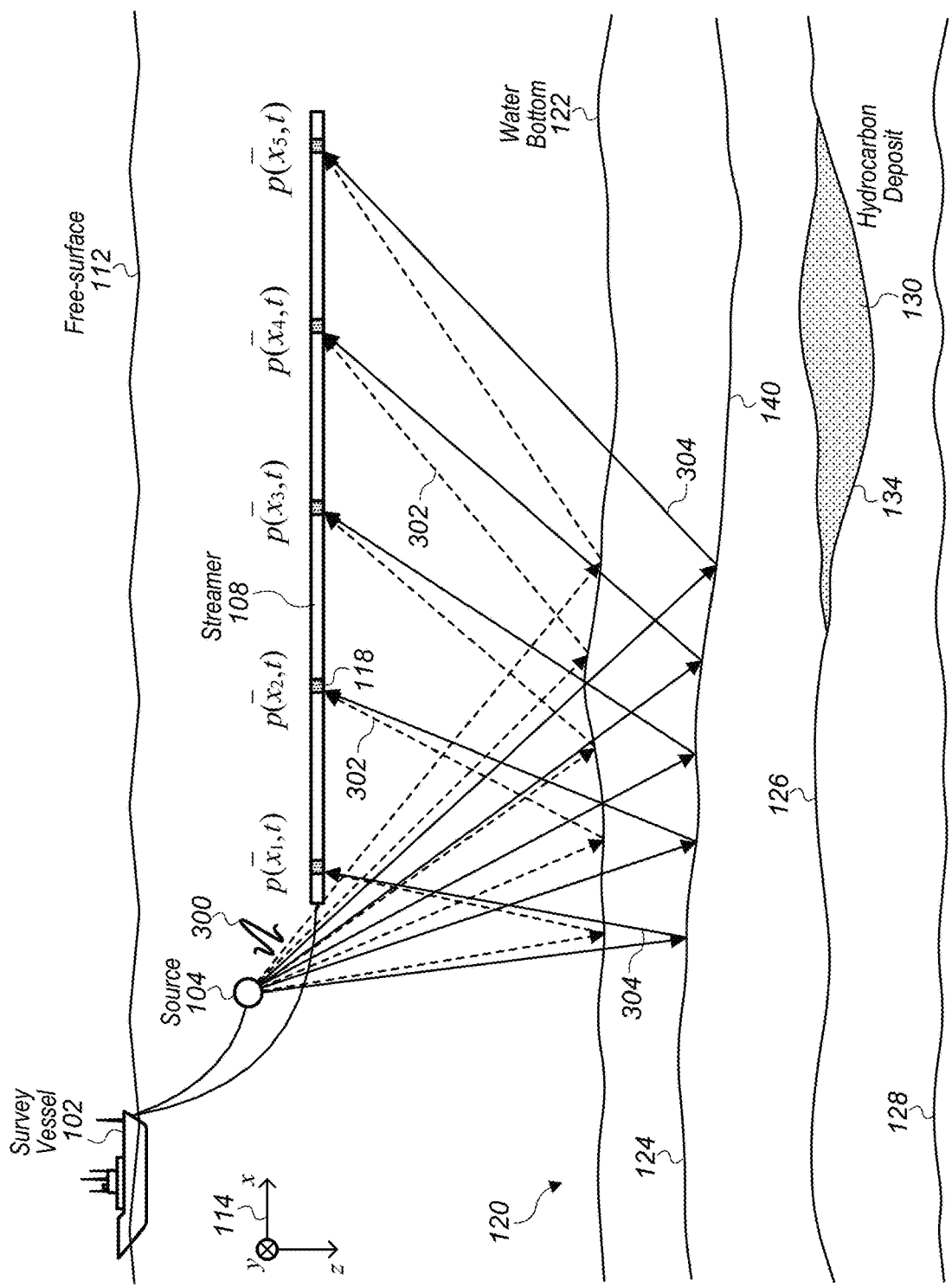
FIG. 3 is an illustration of example ray paths that represent paths of an acoustic signal that travels from a source into a subterranean formation, according to some embodiments.

FIG. 3—Example Ray Paths of an Acoustic Signal

FIG. 3 shows example ray paths that represent paths of an acoustic signal 300 that travels from the source 104 into the subterranean formation 120. Dashed-line rays, such as rays 302, represent acoustic energy reflected from the formation surface 122 to the receivers located along the streamer 108, and solid-line rays, such as rays 304, represent acoustic energy reflected from the interface 124 to the receivers located along the streamer 108. Note that for simplicity of illustration only a handful of ray paths are represented, and ray paths that extend to deeper interfaces are not shown. Each pressure sensor measures the hydrostatic pressure changes in the acoustic energy reflected from the formation 120. The seismic data generated at each receiver, p ($\vec{x}_r$, t), where the receiver subscript r equals 1, 2, 3, 4, and 5, are recorded as separate traces in one or more data-storage devices as described above with reference to Equation (1). In the example of FIG. 3, the collection of traces generated by the five receivers located along the streamer 108 for a single activation of the source 104 may be collected to form a seismic data structure called a "common-shot gather" or simply a "shot gather." The traces generated by the receivers located along each of the six streamers, shown in FIG. 1B, for the same activation of the source may be collected to form six separate common-shot gathers.

Generation of Pseudo Wavefields Using Warping Attribute

Embodiments herein describe methods and apparatus for generating pseudo down-going pressure or particle motion wavefields with a warping attribute using recorded wavefields with multi-sensor or dual-sensor towed streamer acquisition, or with hydrophone-only streamer acquisition.

In some embodiments, a first total wavefield recorded by hydrophone only, multi-sensor, or dual-sensor streamers is decomposed into separated down-going and up-going pressure wavefields. In the case of hydrophone-only records, the down-going and up-going pressure wavefields may be decomposed assuming that the sea-state condition (i.e., the height profile of the sea surface) is flat. Alternatively, in some embodiments multi-sensor or dual-sensor streamer records may be employed and the sea-state condition may be recorded by more than one sensor during the acquisition, such that it may not be necessary to make an assumption about the sea-state condition. Methods are proposed to use the separated wavefields (up-going and down-going wavefields) to derive warping attributes that describe a single time shift between up-going and down-going wavefields per sample and per trace. The warping attribute may be sampled according to seismic data and may be saved as auxiliary data. At any point of the processing and imaging in which a down-going wavefield may normally be used (e.g. multiple prediction or separated wavefield imaging, among other examples), the warping attribute may be used to reconstruct a pseudo down-going wavefield from the up-going wavefield. Alternatively, the warping attribute may be used to reconstruct a pseudo up-going wavefield from the down-going wavefield.

Advantageously, employing the warping attribute to reconstruct a pseudo wavefield may improve computational time, performance, and/or resource requirements, since the warping attribute may be computationally simpler to manipulate than the complete (down-going or up-going) wavefield.

Figure 4:
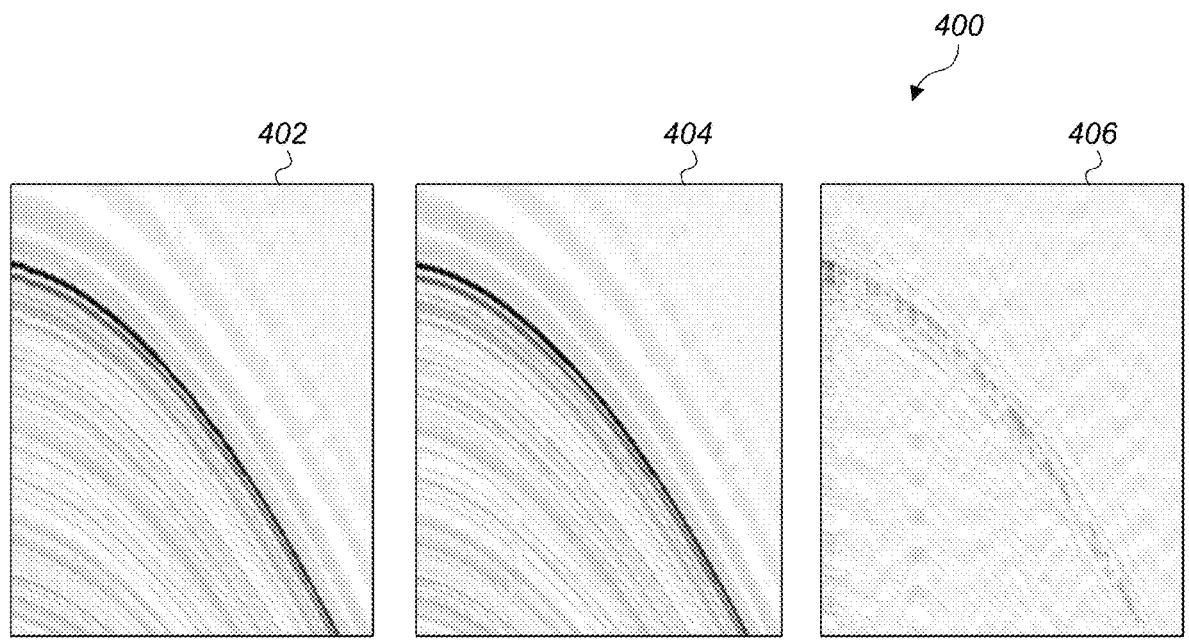
FIG. 4 illustrates shot gathers after re-datuming of up-going pressure wavefields, down-going pressure wavefields, and their difference, according to some embodiments.

FIG. 4—Shot Gathers After Re-Datuming

FIG. 4 illustrates shot gathers after re-datuming of up-going pressure wavefields (P-UP) and down-going pressure wavefields (P-DWN) to an assumed flat free surface, which is used to derive the warping attribute, according to one embodiment. The left image 402 illustrates P-DWN, the center image 404 illustrates P-UP, and the difference 406 is illustrated on the right. The polarity of the P-UP has been inverted so that the difference illustrates the sea-state effect on the reflectivity information.

As illustrated, there is a noticeable difference between P-UP and P-DWN, which may be a result of deviations from uniformity of the sea-state (e.g., swells). Rather than performing complex calculations to derive an explicit model of the sea-state, embodiments herein derive a warping attribute based on the difference between P-UP and P-DWN. As described in further detail below, the warping attribute may be used to derive a pseudo P-UP or P-DWN wavefield.

Figure 5:
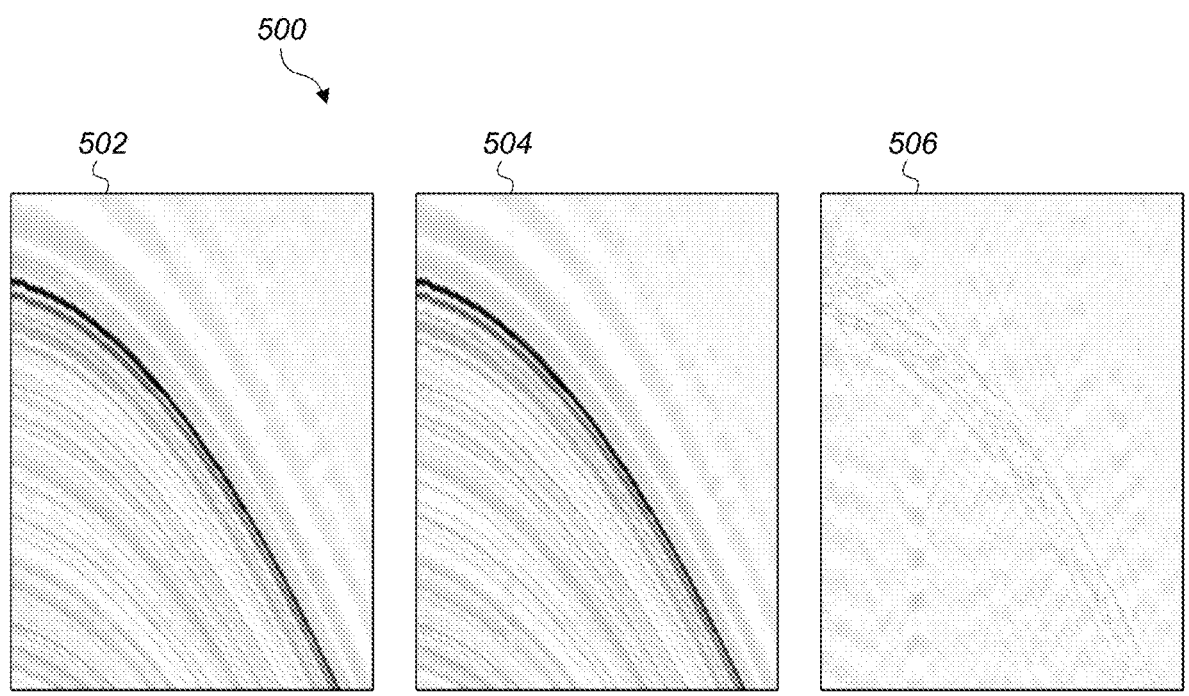
FIG. 5 illustrates shot gathers after application of a warping attribute of up-going pressure wavefields, down-going pressure wavefields, and their difference, according to some embodiments.

FIG. 5—Shot Gathers After Application of Warping Attribute

FIG. 5 illustrates shot gathers after applying the warping attribute to P-UP data in order to simulate P-DWN data (e.g., in order to create a pseudo P-DWN), according to one embodiment. The left image 502 illustrates P-DWN, the center image 504 illustrates P-UP after application of the warping attribute (e.g., the center image illustrates pseudo P-DWN), and the difference 506 is illustrated on the right. As illustrated, the residuals in the difference are greatly reduced.

Figure 6:
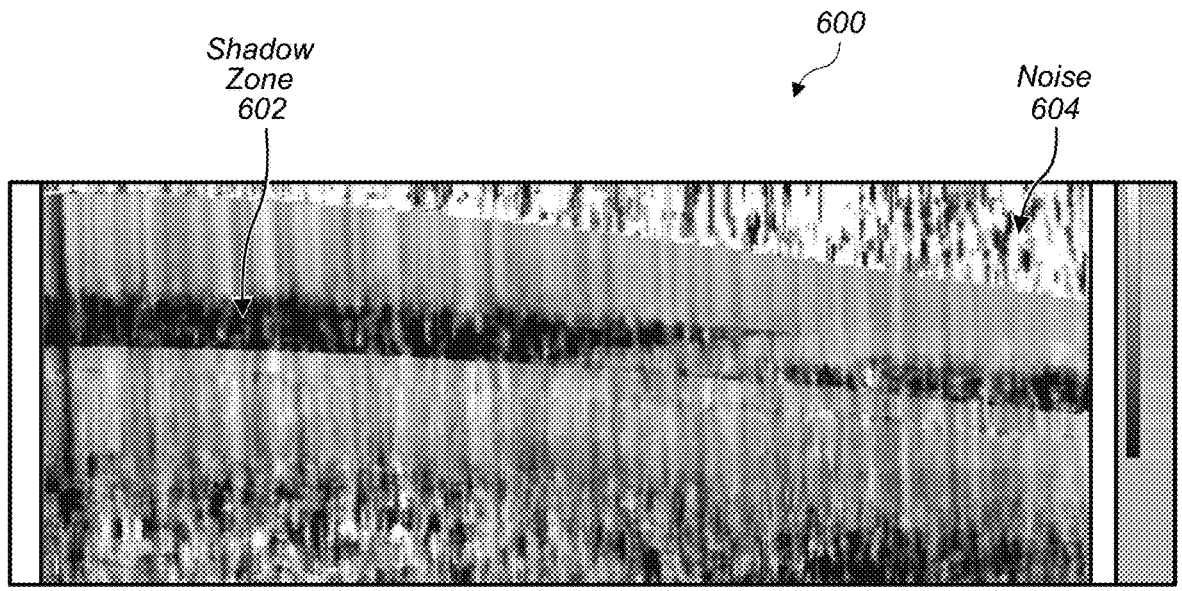
FIG. 6 is an illustration of a warping attribute of shot gathers, according to some embodiments.

FIG. 6—Warping Attribute of Shot Gathers

FIG. 6 is a plot of experimental data illustrating the warping attribute for shot gathers used to align the P-UP data to the P-DWN, according to one embodiment. The warping attribute may be calculated at a rate of one time-shift value per sample. In areas of very low signal-to-noise ratio, the current warping technique may produce noise that can be addressed by constraining the calculation. The effect of noise is illustrated by the lighter triangular region 604 in the top right portion of the graph. Additionally, the 'shadow zone' is caused by a lack of signal, which may likely result from the geological subsurface structure. As illustrated, the near vertical striping represents surface swells that appear to be in slight motion relative to each receiver (hence, they are not perfectly vertical).

Figure 7:
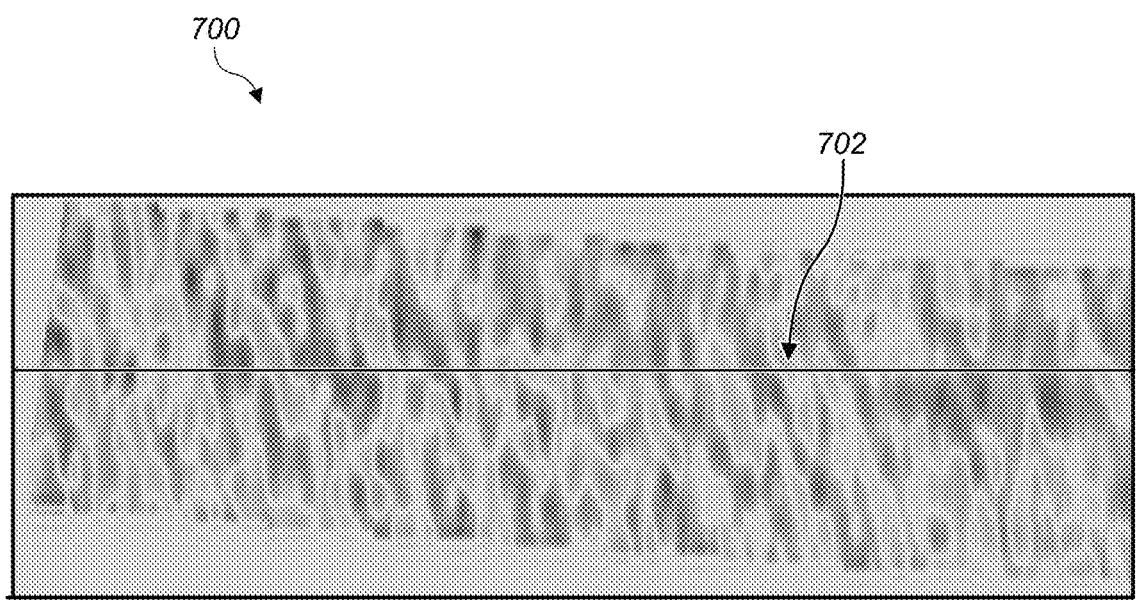
FIG. 7 is an illustration of a time slice of the warping attribute for 3D shot gathers, according to some embodiments.

FIG. 7—Time Slice of Warping Attribute

FIG. 7 is a plot of experimental data illustrating a time slice of the warping attribute for 3D shot gathers used to align the P-UP data to the P-DWN, according to one embodiment. The warping attribute is calculated at a frequency of one time-shift value per sample, here plotted in the receiver Universal Transverse Mercator (UTM) −X and −Y positions. As illustrated, there is a clear distinct pattern and direction of the swell.

In some embodiments, re-datuming may not be required if already done earlier on. Additionally, any error in the re-datuming may not result in adverse effects, as the opposite re-datuming process is applied when warping the up-going wavefield to produce the pseudo down-going wavefield, such that the effect of an error may largely cancel out.

Figure 8:
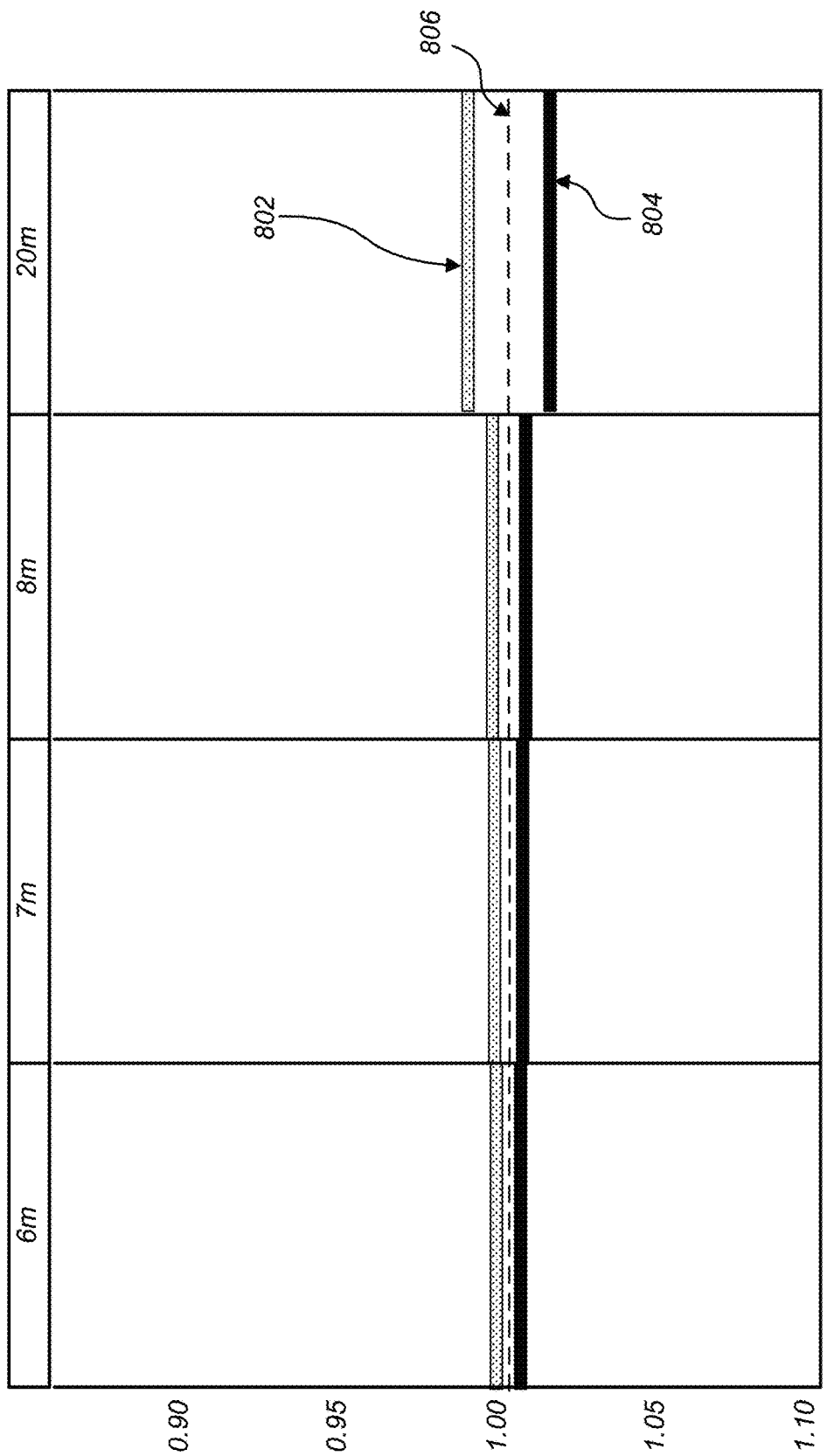
FIG. 8 is an illustration of up-going and down-going wavefields of different sections of streamers at different depths; according to some embodiments.

FIG. 8—Hydrophone-Only Streamers at Different Depths

FIG. 8 is an illustration of different sections of streamers at different depths, where a scattered total pressure wavefield (e.g., up-going plus down-going) has been recorded by hydrophones, according to one embodiment. As illustrated, the dotted band 802 illustrates the arrival time of the up-going wavefield, and the thick solid band 804 illustrates the arrival time of the reflected down-going wavefield. (The dotted line 806 in between the two bands will be discussed in greater detail below with respect to FIG. 17.) For all four illustrated cases, the sea surface is assumed to be constant.

As illustrated, for various streamer depths, the arrival time to the sea surface does not vary if the sea surface is constant (the dotted line 804). The up- and down-going arrivals depart equally from the sea surface arrival time, which is therefore only dependent on the sea surface, as explained in further detail below.

As illustrated, for depths different than 6 m, the arrival time of the scattering event at the free surface is identical in all cases. In producing the data in FIG. 8, the sea surface level was kept constant. As illustrated, the arrival time of the up-going wavefield varies according to the changes in the streamer depth (e.g., following the dotted band 802 arrival time in the figure). The deeper the streamer, the earlier is the arrival time of the up-going wavefield, and the later is the arrival time of the reflected down-going wavefield (thick solid band 804).

By extension, the streamer level may be constant while the sea surface level varies above the streamer. Therefore the warping attribute represents the variations of the water column above the streamer without explicitly modelling the undulations of the sea surface.

In some embodiments, the process of calculating the warping attribute may be applied in sliding windows with temporal and spatial overlap, in order to derive a time- and space-variant sea-state attribute.

Figure 9:
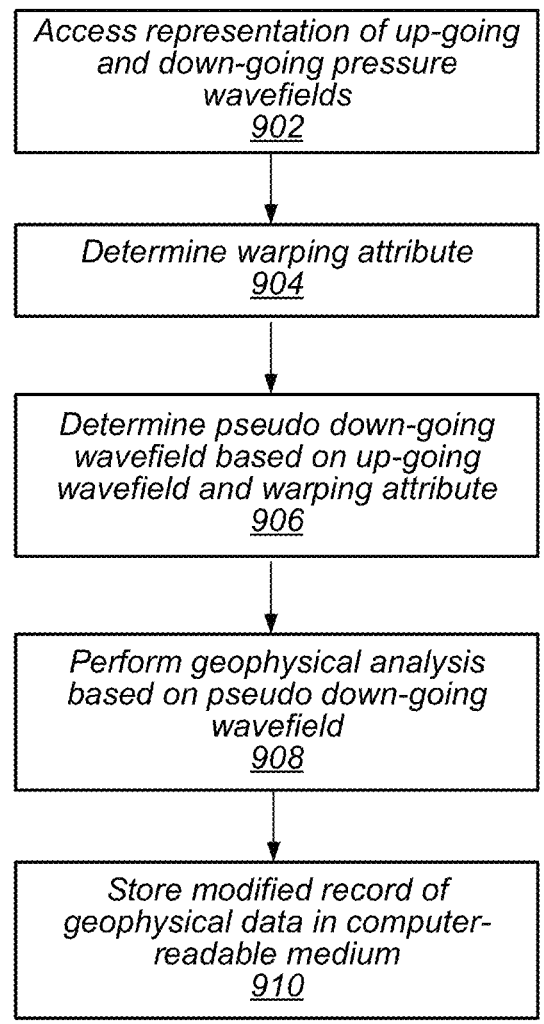
FIG. 9 is a flow diagram illustrating an example of a method for employing a warping attribute to derive a pseudo down-going wavefield and create a geophysical data product, according to some embodiments.

FIG. 9—Using Warping Attribute to Derive Pseudo P-DWN

FIG. 9 is a flow chart diagram illustrating an example of a method for employing a warping attribute to derive a pseudo down-going wavefield and manufacture a geophysical data product, according to some embodiments. As explained in detail below, in these embodiments, a comprehensive imaging workflow is described that is specific to data acquired with dual-sensor (pressure and particle motion sensors). In some embodiments, the methods may be employed by a computer system comprising one or more processors coupled to a non-transitory computer readable memory medium. The method shown in FIG. 9 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 902, representations of up-going and down-going pressure wavefields may be accessed. In some embodiments, the pressure wavefields may be received from a seismic data acquisition system located beneath a free-surface of a body of water (e.g., the system described in FIGS. 1-3, or a similar system). For example, the seismic data acquisition system may contain dual hydrophone and vertical particle motion sensors, which may be used to separate up-going and down-going contributions to the measured pressure wavefield. In some embodiments, a means for receiving up-going and/or down-going pressure wavefields may include instructions executable by one or more processors to retrieve records that encode the pressure wavefields. For example, such instructions may be executable to interface with a storage device that stores the records. Alternatively, such instructions may be executable to retrieve the records from a different computer system or a network rather than a storage device, or from the seismic data acquisition system directly (e.g., during the collection of survey data).

At 904, a warping attribute may be determined based on the up-going and down-going pressure wavefields. In some embodiments, the warping attribute may be determined based on a difference between the up-going and down-going pressure wavefields. The warping attribute may be multi-dimensional, wherein the multiple dimensions include time, channel number on a streamer, and streamer number, although other dimensions may also be defined. In other words, a warping attribute may be determined based on a difference between P-UP and P-DWN for each of a plurality of streamers, for each channel number on each streamer, and/or at each of a plurality of different points in time. Utilization of the warping attribute may advantageously improve resolution and reduce noise for imaging of 3D and time-lapse surveys. In some embodiments, the warping attribute may describe a time shift for each of a plurality of samples and each of a plurality of traces associated with the up-going and down-going pressure wavefields. In some embodiments, a means for determining the warping attribute may include instructions executable by one or more processors to generate a difference between the up-going and down-going pressure wavefields. For example, such a difference may be generated in a scalar or vector space, or in a pre- or post-migration domain. The particular difference operator employed may include a simple subtraction operation, but may encompass more complex difference operators such as weighted differences. Further examples of means for determining the warping attribute are discussed below with respect to FIG. 11, blocks 1110-1112.

In some embodiments, the warping attribute may be usable to align two wavefields that are supposed to be very similar. This alignment may be performed with high resolution (i.e. per sample), and in one or more directions (multi-dimensionality). The warping attribute may represent a shift or displacement required in order to achieve the alignment. There may be various criteria used to define the alignment, such as local minimum difference, maximum cross-correlation, and/or maximum (local) similarity, among other possibilities.

At 906, a pseudo down-going pressure wavefield (pseudo P-DWN) may be determined based on P-UP and the warping attribute. Pseudo P-DWN may be determined by adding the warping attribute to P-UP to obtain Pseudo P-DWN. In the case of a multi-dimensional warping attribute, pseudo P-DWN may be generated at each of a plurality of times, for each of a plurality of streamers, and/or for each channel number on each of the streamers. Pseudo P-DWN may be generated at any instance wherein P-DWN would be computationally used. In some embodiments, a means for determining the pseudo down-going pressure wavefield may include instructions executable by one or more processors to combine the warping attribute to the up-going pressure wavefield. For example, such a combination may be generated in a scalar or vector space, or in a pre- or post-migration domain. The particular operator employed to perform the combination may include a simple addition operation, but may encompass more complex combination operators such as weighted differences or convolution. As discussed below with respect to FIG. 10, equivalent means may be employed to determine a pseudo up-going pressure wavefield based on the down-going pressure wavefield and the warping attribute.

At 908, geophysical analysis may be performed based at least in part on pseudo P-DWN to generate a modified record of geophysical data. For example, pseudo P-DWN may be used in place of the previously determined P-DWN for any of a variety of geophysical calculations (e.g., de-ghosting of a measured pressure wavefield). Pseudo P-DWN may be used for separated wavefields imaging. In other words, pseudo P-DWN may be used to generate an image of subsurface seafloor structure using separated wavefields (e.g., using pseudo P-DWN and P-UP), for example. In some embodiments, pseudo P-DWN may be used for multiple prediction. In some embodiments, pseudo P-DWN may be used in conjunction with P-DWN for signal-to-noise analysis and processing. For example, a difference between pseudo P-DWN and P-DWN may be used to estimate a level of noise or error in the pressure wavefield data. It is noted that in various embodiments, the warping attribute enables the pseudo down-going pressure wavefield to be generated from the up-going pressure wavefield without persistently storing or otherwise depending on a record of the down-going pressure wavefield. Because wavefield records may be very large data sets requiring substantial storage and processing capability to manage, eliminating dependence the record of the down-going pressure wavefield may reduce computational resources (e.g., storage and/or processing capability) required to generate the modified record of geophysical data. A similar improvement may result from using the warping attribute to generate a pseudo up-going pressure wavefield from the down-going pressure wavefield, as discussed below with respect to FIG. 10.

In some embodiments, various items of information relating to geophysical surveying (e.g., any of the various examples described above), such as data collected by sensors, may be considered a modified record of geophysical data, which may be embodied in a "geophysical data product." A geophysical data product may comprise a computer-readable, non-transitory medium having geophysical data stored on the medium (such as raw streamer data, processed streamer data, two- or three-dimensional maps based on streamer data, or other configurations of a data product). Some non-limiting examples of computer-readable media may include hard drives, CDs, DVDs, flash memory, print-outs, etc. In some embodiments, raw analog data from streamers may be stored in the geophysical data product. In other instances, the data may first be digitized and/or conditioned prior to being stored in the geophysical data product. In yet other instances, the data may be fully processed into a two- or three-dimensional map of the various geophysical structures before being stored in the geophysical data product.

At 910, a geophysical data product may be manufactured, e.g., by storing the modified record of geophysical data resulting from the geophysical analysis performed based on pseudo P-DWN in a non-transitory computer readable memory medium as described above, which may be further included within a computer system. In some embodiments, a means for storing a modified record of geophysical data may include instructions executable by one or more processors to store records that encode the modified data. For example, such instructions may be executable to interface with a storage device that stores the records. Alternatively, such instructions may be executable to store the records to a different computer system or a network rather than a storage device.

Figure 10:
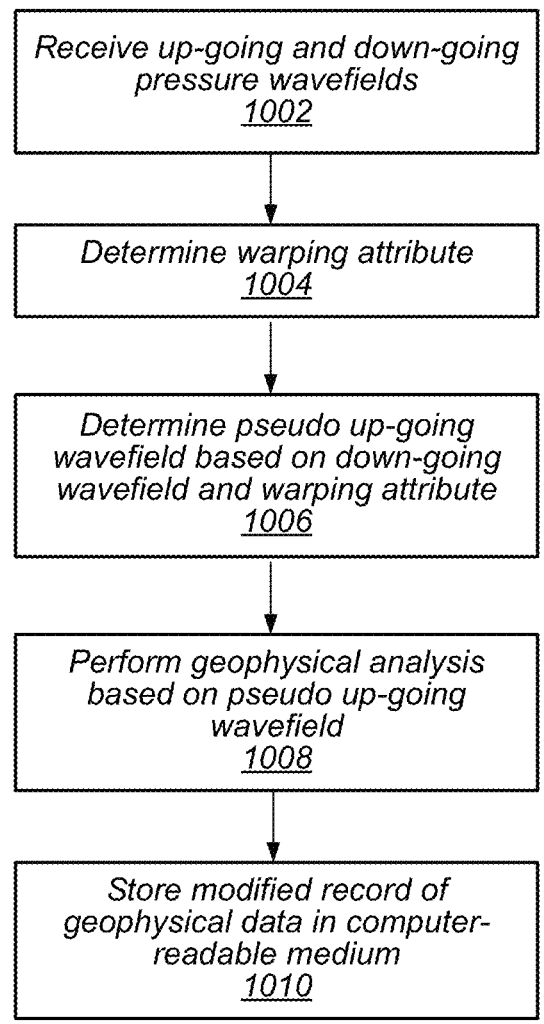
FIG. 10 is a flow diagram illustrating an example of a method for employing a warping attribute to derive a pseudo up-going wavefield and create a geophysical data product, according to some embodiments.

FIG. 10—Using Warping Attribute to Derive Pseudo P-UP

FIG. 10 is a similar flow chart as FIG. 9, except that FIG. 10 describes a method whereby the warping attribute is added to P-DWN to obtain a pseudo up-going pressure wavefield, pseudo P-UP. The method shown in FIG. 10 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

Blocks 1002-1010 of FIG. 10 may proceed analogously to blocks 902-910, which are described above in reference to FIG. 9. A notable distinction of FIG. 10 from FIG. 9 is that, e.g., at 1006, pseudo P-UP is determined based on the warping attribute and P-DWN. Additionally, at 1008, a geophysical analysis is performed based on pseudo P-UP (e.g., and potentially further based on P-DWN) to generate a modified record of geophysical data. In other words, an analogous process to that described in reference to FIG. 9 may be employed to derive a pseudo P-UP, rather than pseudo P-DWN.

Figure 11:
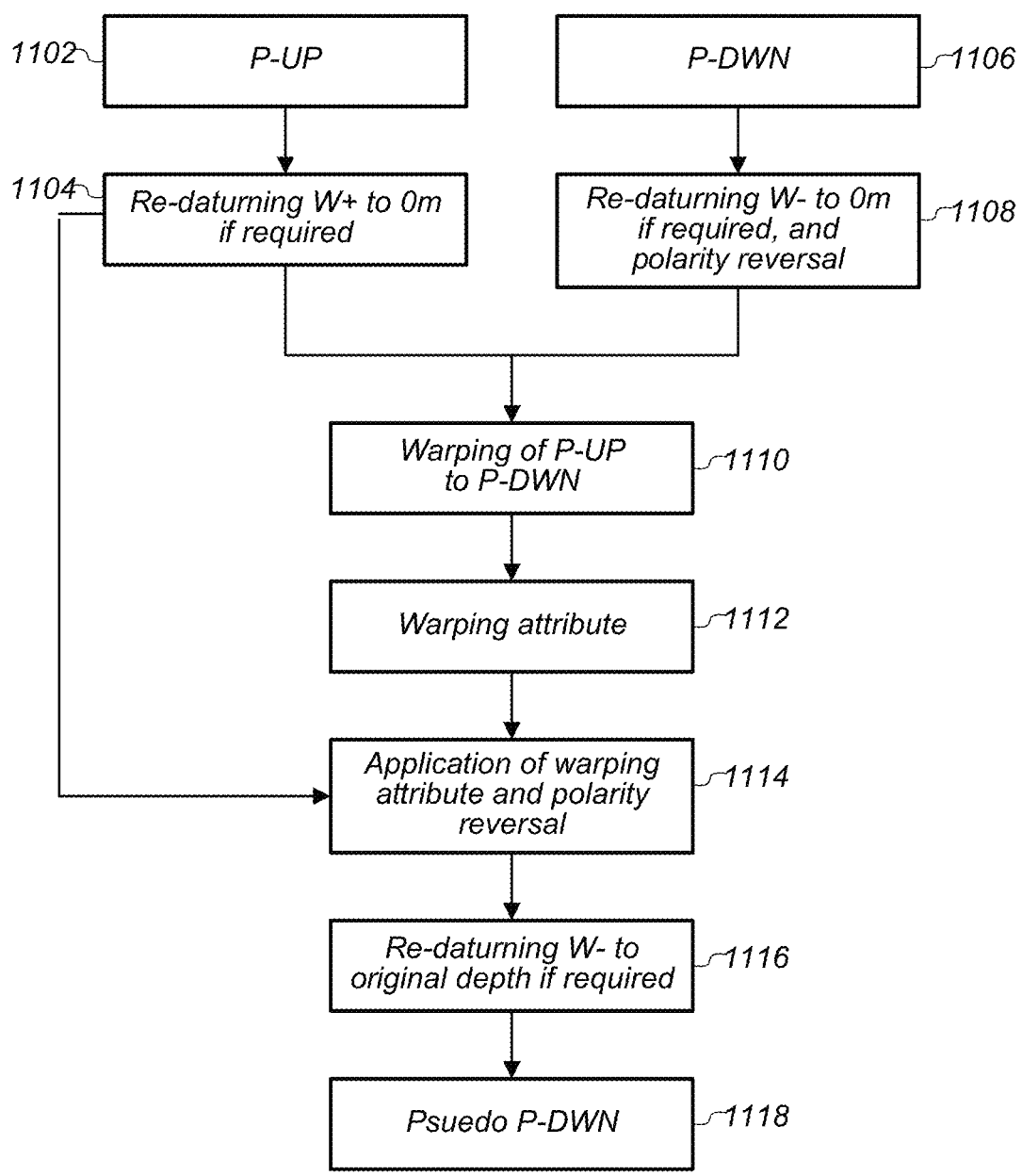
FIG. 11 is a detailed flow diagram illustrating an example of a method for applying a warping attribute using multi-component streamer records to derive a pseudo down-going wavefield, according to some embodiments.

FIG. 11—Derivation of Pseudo P-DWN

FIG. 11 is a detailed flowchart illustrating a method for determining the warping attribute, and further for using the warping attribute to determine pseudo P-DWN, according to some embodiments. The following operations may describe a similar process to blocks 902-906 above in further detail, according to some embodiments.

At 1102, P-UP may be received, and at 1106, P-DWN may be received. As variously described above, P-UP and P-DWN may be received from a seismic data acquisition system located beneath a free-surface of a body of water.

At 1104, re-datuming may be performed on P-UP to obtain a redatumed P-UP, if it is required or desirable. For example, the P-UP wavefield may be shifted forward to calibrate the wavefield to the zero meter mark (e.g., the depth of the streamers may be designated as the zero meter mark). Similarly, at 1106, re-datuming may be performed on P-DWN to obtain a re-datumed P-DWN, if it is required or desirable. For example, the P-DWN wavefield may be shifted backwards to calibrate the wavefield to the zero meter mark. Additionally, since the down-going pressure wavefield was previously reflected off the surface of the water, a polarity reversal may be applied to P-DWN to correct for the phase shift introduced upon reflection.

At 1110 and 1112, the difference between P-UP and P-DWN may be used to determine the warping attribute.

At 1114-1118, the warping attribute and the re-datumed P-UP may be used to generate pseudo P-DWN. At 1114, the warping attribute may be added to the re-datumed P-UP and the polarity reversal may be reapplied to obtain an intermediate pressure wavefield. At 1116, the intermediate pressure wavefield may be re-datumed back to the original depth, if required, to obtain pseudo P-DWN.

Figure 12A:
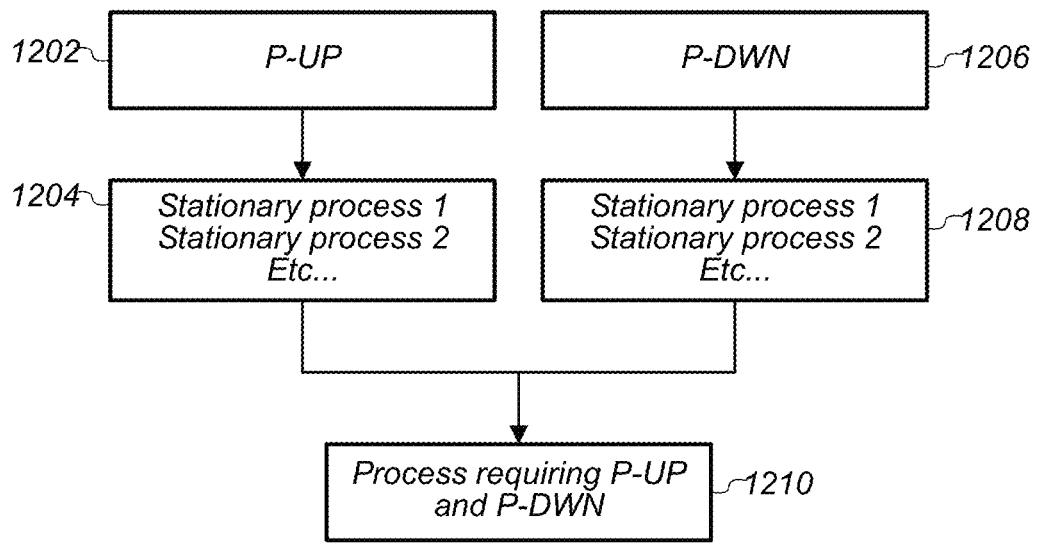
FIGS. 12A-12B are flow diagrams illustrating two methods, for creating a geophysical data product with up-going and down-going wavefields, according to some embodiments.
Figure 12B:
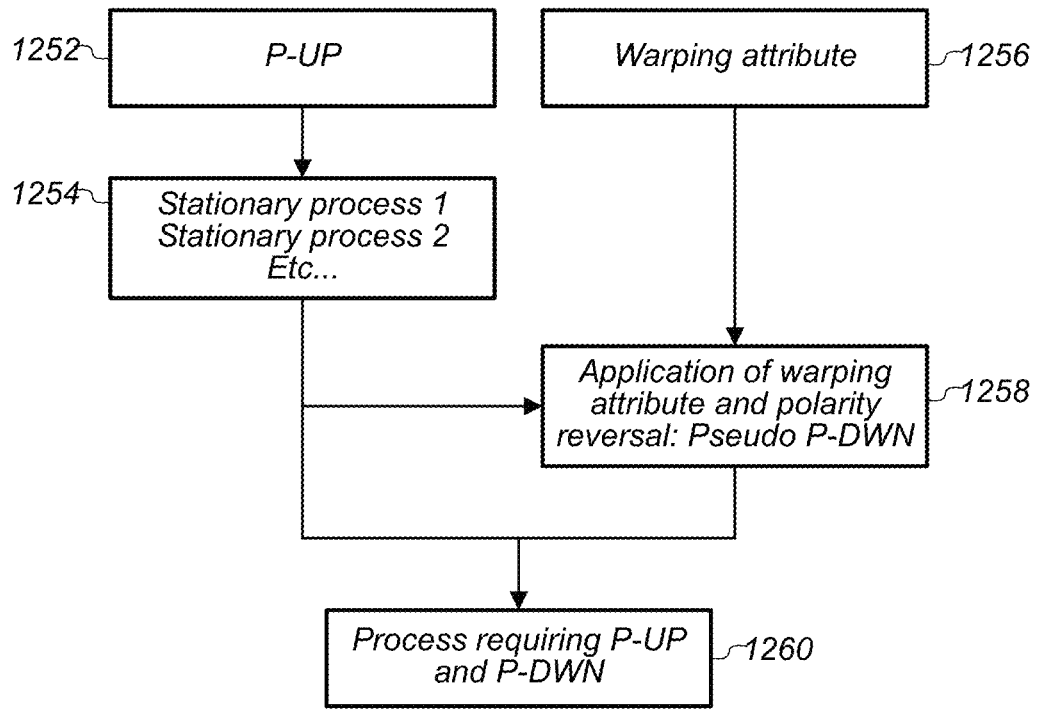

FIGS. 12A-12B—Stationary Processing with P-DWN and Pseudo P-DWN

FIG. 12A illustrates one method for manufacturing a geophysical data product based on P-UP and P-DWN.

As illustrated, at 1202 and 1206, P-UP and P-DWN may be received, e.g., by a computer system. At 1204 and 1208, various stationary processes may be performed for each of P-UP and P-DWN, respectively. For example, stationary processes 1 and 2 may be performed for P-UP. In various embodiments, a stationary process may be a stationary (non time-dependent) filter (1D, 2D or of higher dimension) such as a band-pass filter, a frequency-wavenumber (F-K) filter, or a data mute, among other possibilities. Specific examples of stationary processes may include designature, source deghosting, and noise attenuation, among other possibilities.

At 1210, a process may be performed using each of P-UP and P-DWN, subsequent to the completion of various stationary processes. For example, a modified record of geophysical data may be generated based on P-UP and P-DWN, which may be stored as a geophysical data product.

Examples of such stationary processes are separated wavefield imaging and multiple modeling.

FIG. 12B illustrates another method for manufacturing a geophysical data product, according to some embodiments.

As illustrated, P-UP and a warping attribute may be received at 1252 and 1256, respectively.

At 1254, various stationary processes may be performed for P-UP. At 1258, the processed P-UP may be used in conjunction with the warping attribute to obtain pseudo P-DWN. More specifically, the warping attribute may be added to P-UP and a polarity reversal may be applied to obtain pseudo P-DWN.

At 1260, a process may be performed that requires P-UP and P-DWN. The process may be performed using pseudo-PWN instead of P-DWN, and the process may be used to manufacture a geophysical data product as discussed above.

Figure 13:
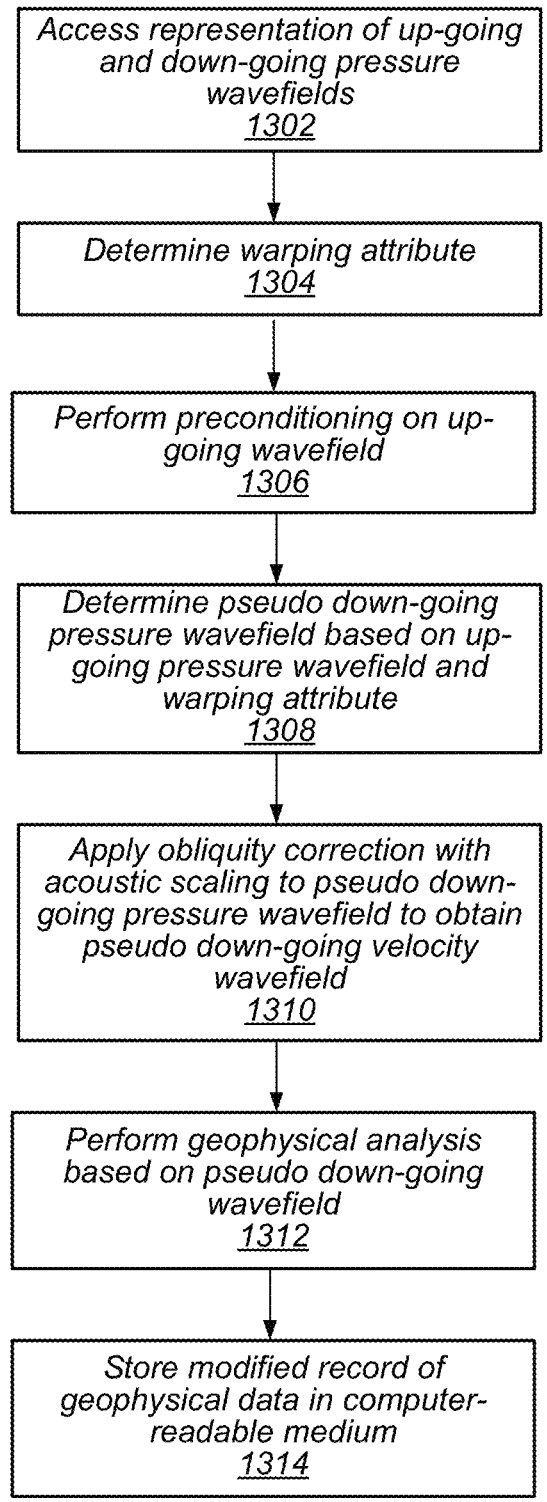
FIG. 13 is a flow diagram illustrating an example of a method for employing a warping attribute to derive a pseudo down-going particle motion wavefield and create a geophysical data product with additional operations, according to some embodiments.

FIG. 13—Expanded Flow Chart for Using Pseudo P-DWN

FIG. 13 is a flowchart diagram similar to FIG. 9, but with the inclusion of additional operations. As illustrated, each of blocks 1302-1304, 1308, and 1312-1314 may proceed similarly to blocks 902-904, 908, and 912-914 described above in reference to FIG. 9. However, FIG. 13 additionally includes blocks 1306 and 1310. The method shown in FIG. 13 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 1306, the computer system may perform preconditioning on the up-going wavefield, prior to the determination of pseudo P-DWN. In these embodiments, preconditioning may not be performed on the down-going wavefield, thereby preserving computational resources and processing time. Determining pseudo P-DWN based on P-UP may reflect the preconditioning. The preconditioning may serve to improve the subsequent determination of pseudo P-DWN at 1308. In some embodiments, preconditioning may be performed prior to demultiple and imaging. In these embodiments, only one of the P-UP or P-DWN may be used and pre-conditioned, thereby avoiding having to save various instances of both P-UP and P-DWN sets as only one is required in addition to the warping attribute.

At 1310, an obliquity correction may be applied with acoustic scaling to pseudo P-DWN to obtain a pseudo down-going particle motion wavefield. (Generally speaking, a particle motion wavefield may reflect any suitable aspect of particle motion, such as velocity or acceleration, for example.) For example, an obliquity correction may use known physical properties of water or seawater to determine the particle motion wavefield from the pressure wavefield. The pseudo down-going particle motion wavefield (pseudo V-DWN) may then be used (e.g., at 1312) to perform geophysical analysis to generate a modified record of geophysical data. For example, pseudo V-DWN may be used for convolution in surface-related multiple elimination (SRME), or for multiple prediction.

Figure 14:
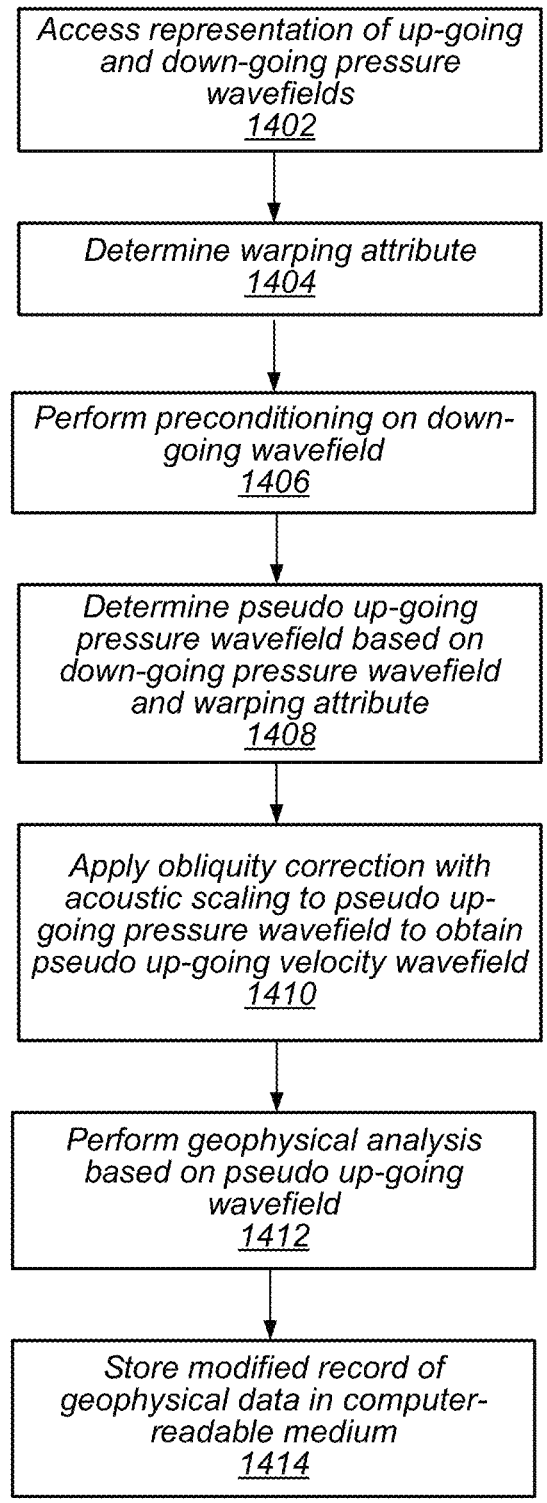
FIG. 14 is a flow diagram illustrating an example of a method for employing a warping attribute to derive a pseudo up-going particle motion wavefield and create a geophysical data product with additional operations, according to some embodiments.

FIG. 14—Expanded Flow Chart for Using Pseudo P-UP

FIG. 14 is a similar flow chart as FIG. 13, except that FIG. 14 describes a method, including additional operations. whereby the warping attribute is added to P-DWN to obtain a pseudo up-going pressure wavefield, pseudo P-UP, according to some embodiments. The method shown in FIG. 14 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

Blocks 1402-1414 of FIG. 14 may proceed analogously to blocks 1302-1314, which are described above in reference to FIG. 13. A notable distinction of FIG. 14 from FIG. 13 is that, e.g., at 1406, preconditioning may be performed on the down-going wavefield, and at 1408, pseudo P-UP may be determined based on the warping attribute and P-DWN. Additionally, at 1410, an obliquity correction may be applied to pseudo P-UP to obtain a pseudo up-going particle motion wavefield, and at 1412 geophysical analysis may be performed to generate a modified record of geophysical data based on the pseudo up-going particle motion wavefield (e.g., and potentially further based on P-DWN or a down-going particle motion wavefield). In other words, an analogous process to that described in reference to FIG. 13 may be employed to derive and use a pseudo up-going particle motion wavefield, rather than a pseudo down-going particle motion wavefield.

Figure 15:
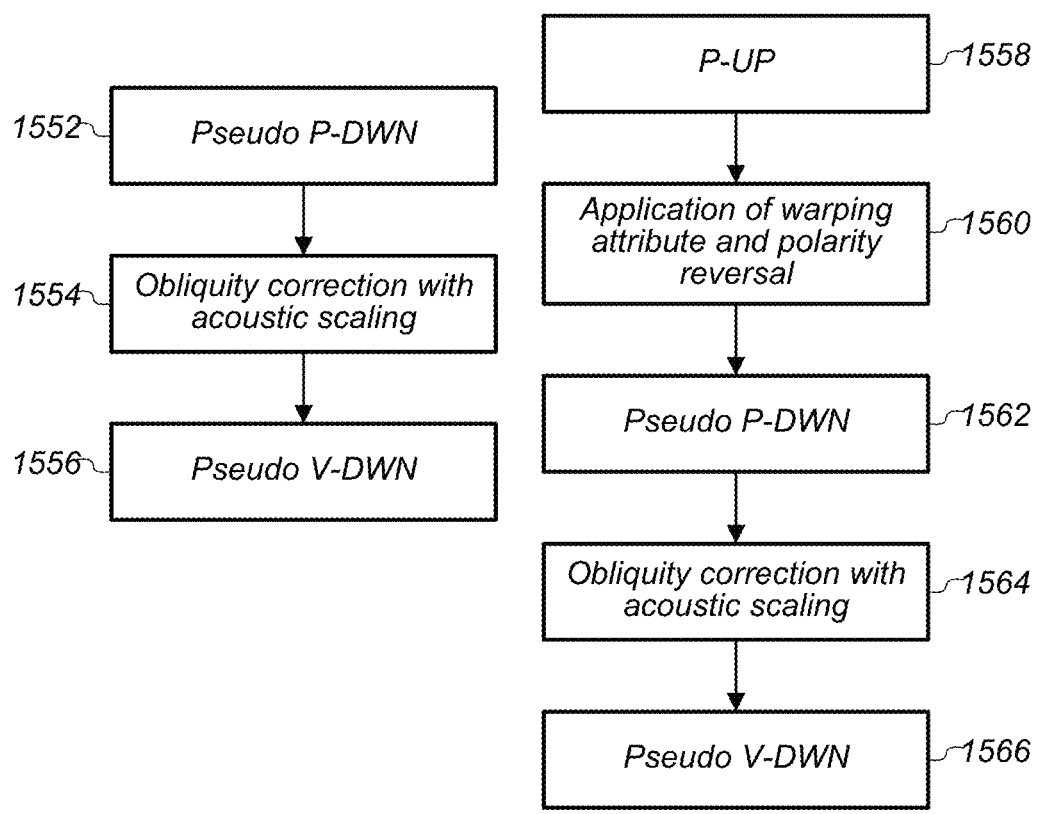
FIG. 15 is a flow diagram illustrating a method for applying an obliquity correction to pressure wavefields to produce vertical particle motion wavefields, according to some embodiments.

FIG. 15—Obliquity Correction Flow Chart

FIG. 15 is a detailed flowchart illustrating a method for utilizing an obliquity correction to obtain a particle motion wavefield.

Generally speaking, an obliquity correction may be applied the P-UP wavefield to obtain a vertical particle motion wavefield, V-UP. The obliquity correction may be applied according to any of various standard techniques, whereby a particle motion wavefield is determined from a pressure wavefield.

In FIG. 15, this process is shown with respect to the derived pseudo P-UP/P-DWN wavefields discussed above. Specifically, an obliquity correction is applied 1554 to pseudo P-DWN to obtain a pseudo down-going vertical particle motion wavefield, pseudo V-DWN.

Alternatively, in the right flow chart of FIG. 15, as described in greater detail above, a warping attribute and polarity reversal may be applied to P-UP to obtain pseudo P-DWN. Subsequently, an obliquity correction 1564 may be applied to pseudo P-DWN to obtain pseudo V-DWN.

Figure 16:
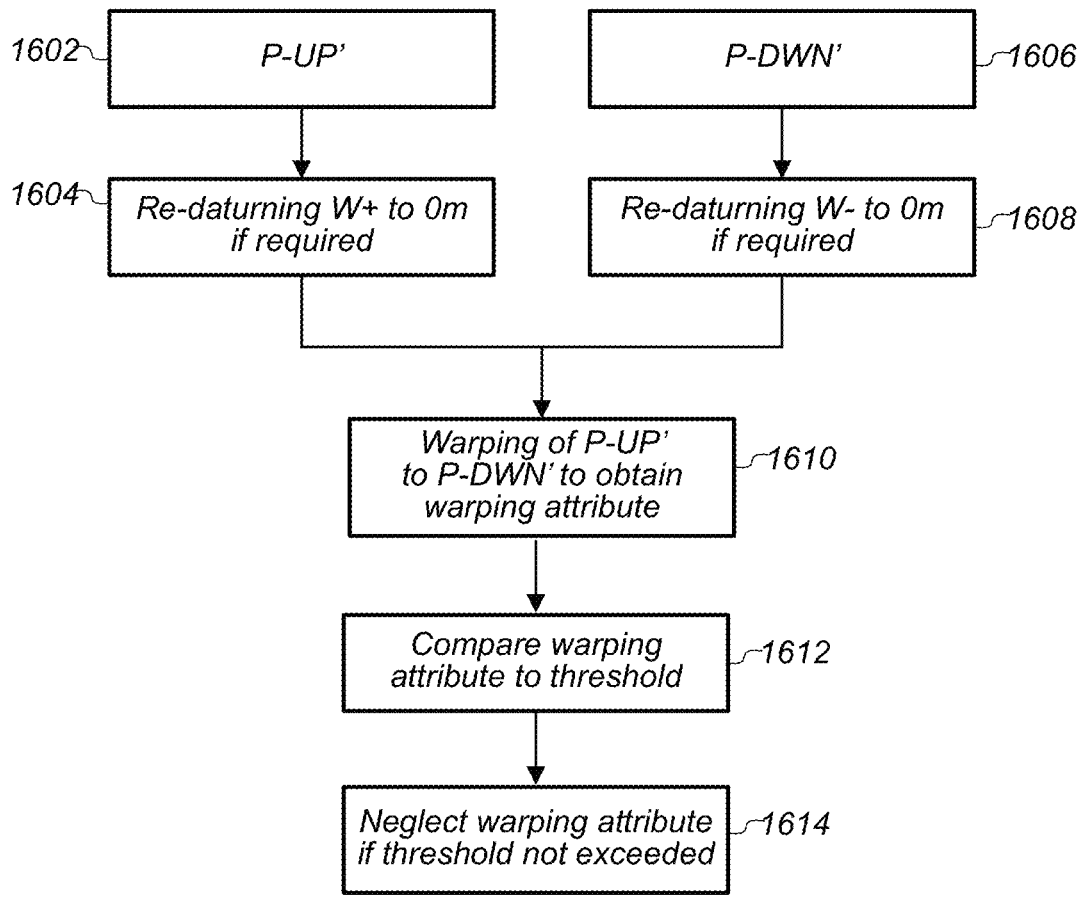
FIG. 16 is a flow diagram illustrating a method for using approximate pressure wavefields to derive a warping attribute, according to some embodiments.

FIG. 16—Comparison of Warping Attribute to Predetermined Threshold

FIG. 16 is a detailed flowchart illustrating a method for determining the warping attribute using approximate P-UP' and P-DWN'. Advantageously, methods described herein may be used in conjunction with approximate P-UP' and P-DWN' wavefields, wherein the warping attribute may be determined and utilized without requiring the approximate wavefields to be first refined to a greater degree of accuracy. For example, approximate wavefields may be used to determine a warping attribute even if the approximate wavefields have been determined with only a coarse or approximate accuracy.

At 1602, P-UP' may be received, and at 1606, P-DWN' may be received. As variously described above, P-UP' and P-DWN' may be received from a seismic data acquisition system located beneath a free-surface of a body of water.

At 1604, re-datuming may be performed on P-UP' to obtain a redatumed P-UP', if it is required or desirable. For example, the approximate P-UP' wavefield may be shifted forward to calibrate the wavefield to the zero-meter mark (e.g., the depth of the streamers may be designated as the zero-meter mark). Similarly, at 1606, re-datuming may be performed on P-DWN' to obtain a re-datumed P-DWN', if it is required or desirable. For example, the P-DWN' wavefield may be shifted backwards to calibrate the wavefield to the zero-meter mark. Additionally, since the down-going pressure wavefield was previously reflected off the surface of the water, a polarity reversal may be applied to P-DWN to correct for the phase shift introduced upon reflection.

At 1610, the difference between P-UP' and P-DWN' may be used to determine the warping attribute. For example, as described in greater detail above, the warping attribute may be determined based on a difference between P-UP' and P-DWN'.

At 1612, the size or magnitude of the warping attribute may be compared to a predetermined threshold to determine whether to employ the warping attribute in subsequent calculations. For example, it may be determined whether the warping attribute is always less than some absolute time value (e.g., less than 0.05 ms, or some other time value), or is always less than a percentage of the magnitudes of one, both, or the average of P-UP' and P-DWN' (e.g., less than 5% or another percentage). Alternatively, it may be determined whether the average value of the warping attribute is less than the predetermined threshold.

At 1614, the warping attribute may be neglected if the warping attribute does not exceed the predetermined threshold. For example, if the warping attribute is determined to not exceed the predetermined threshold, subsequent calculations (e.g., any of the calculations associated with FIGS. 9-15) may be undergone without using the warping attribute. In other words, the difference between P-UP' and pseudo P-UP, and/or the difference between P-DWN' and pseudo P-DWN may be neglected, so that P-UP' may be used directly as pseudo P-DWN' without application of the warping attribute (or equivalently, P-DWN' may be used directly as pseudo P-UP' without application of the warping attribute) in subsequent calculations. That is, in circumstances where the warping attribute is sufficiently small, P-UP' and P-DWN' may be treated as interchangeable. This may advantageously preserve computational resources without introducing an excessive degree of error, according to various embodiments. For example, if the warping attribute is omitted, the computational cycles needed to apply the warping attribute can likewise be omitted, reducing the latency of computation, power consumption, or otherwise improving computational performance.

Figure 17:
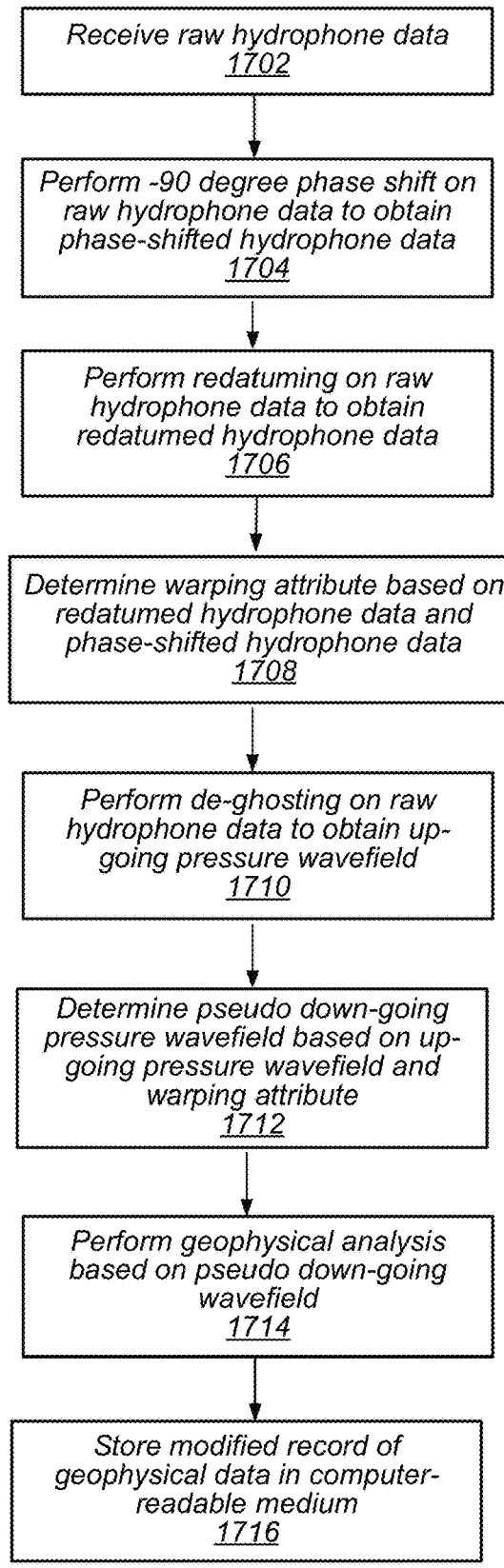
FIG. 17 is a flow diagram illustrating a method for deriving and using a warping attribute from hydrophone-only data, and using the warping attribute to derive a pseudo down-going wavefield and create a geophysical data product, according to some embodiments.

FIG. 17—Warping Attribute from Hydrophone-Only Data

FIG. 17 is a flow diagram illustrating an alternative method for deriving and using a warping attribute from hydrophone-only data, according to some embodiments. In these embodiments, a workaround data flow to derive the warping attribute, similar to that described above, is used for data recorded with hydrophone-only streamers (e.g., without a dual-sensor vertical particle motion sensor). As opposed to embodiments described above in reference to, e.g., FIG. 9, FIG. 17 illustrates a method for deriving a warping attribute using hydrophone-only data, and using the warping attribute to derive a pseudo down-going wavefield and manufacture a geophysical data product, according to some embodiments. The method shown in FIG. 17 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. In particular, as with all flow charts presented here, elements that are shown in sequence may in fact be performed in parallel, or in a different order with respect to other elements than is shown.

At 1702, raw hydrophone data may be received. The raw hydrophone data may represent a received pressure wavefield (e.g., containing both up-going and down-going wavefield contributions) obtained from a seismic data acquisition system located beneath a free surface of a body of water.

At 1704, a minus 90-degree phase shift may be performed on the raw hydrophone data to obtain phase-shifted hydrophone data. As may be appreciated by those of skill in the art, a minus 90-degree phase shift may produce phase-shifted hydrophone data that is insensitive to non-uniformities of the sea state. For example, in reference to the illustrated wavefields of FIG. 8, introduction of a minus 90-degree phase shift may effectively collapse the two reflection events shown in FIG. 8 into a single event that is centered on the sea surface. That is, applying the minus 90-degree phase shift may generally have the effect of shifting most of the energy of an event to the same reference point (e.g., along the time axis shown in FIG. 8) regardless of the streamer depth or free surface state. This effect is shown in FIG. 8 by line 806, which represents the phase-shifted data for each streamer depth case as a constant value.

At 1706, redatuming may be performed on the raw hydrophone data to obtain redatumed hydrophone data. For example, the raw hydrophone data may be shifted forward to calibrate the wavefield to the zero-meter mark (e.g., the depth of the streamers may be designated as the zero-meter mark). Because the actual sea state may not be entirely uniform, or there may be other sources of error in assumptions made in redatuming (e.g., the location assumed to be the zero-meter mark may actually correspond to some other value), the redatumed hydrophone data may preserve information related to non-uniformities of the sea state. For example, in reference to the illustrated wavefields of FIG. 8, redatuming to the presumed zero-meter mark may shift the down-going wavefield (thick solid band 804) to a point that is not constant, as in the case of the minus 90-degree phase shift, but in fact varies dependent upon the actual free surface state. (For clarity of representation, the effect of redatuming is not shown in FIG. 8, but may be understood to be parallel to, for example, line 804 at a time axis location that varies according to streamer depth.) Hence, as described in further detail below, the difference between the phase-shifted and the redatumed hydrophone data may contain information related to the deviation of the sea-surface from uniformity (i.e., the difference may contain information related to the warping attribute).

At 1708, a warping attribute may be determined based on a difference between the redatumed hydrophone data and the phase-shifted hydrophone data. The redatumed hydrophone data and the phase-shifted hydrophone data may react differently to non-uniformities of the sea state, such that the difference between them may serve as an approximation of the warping attribute. The warping attribute may be multi-dimensional, comprising a time dimension, a channel number on a streamer dimension, and a streamer number dimension. The warping attribute may be converted into units of distance, and may be considered a first depth estimate for use in de-ghosting and re-datuming.

At 1710, de-ghosting may be performed on the raw hydrophone data to obtain an up-going pressure wavefield, P-UP'. De-ghosting may be performed using a depth estimate obtained from the warping attribute.

At 1712, a pseudo down-going pressure wavefield, pseudo P-DWN, may be determined based on the up-going pressure wavefield and the warping attribute. For example, the warping attribute may be added to the up-going pressure wavefield to obtain pseudo P-DWN.

In some embodiments, each of blocks 1704-1712 may be iteratively repeated to sequentially refine the warping attribute. For example, P-UP' and pseudo P-DWN may be used to derive a refined warping attribute, which may subsequently be used to determine a refined depth estimate, which may then be used in a subsequent de-ghosting calculation on the raw hydrophone data to obtain a refined estimate of P-UP'.

At 1714, geophysical analysis may be performed to generate a modified record of geophysical data at least in part based on the pseudo P-DWN. For example, pseudo P-DWN may be used for performing multiple prediction.

At 1716, the geophysical data may be stored in a memory medium, such as a non-transitory computer readable memory medium, thereby completing the manufacture of the geophysical data product.

Figure 18:
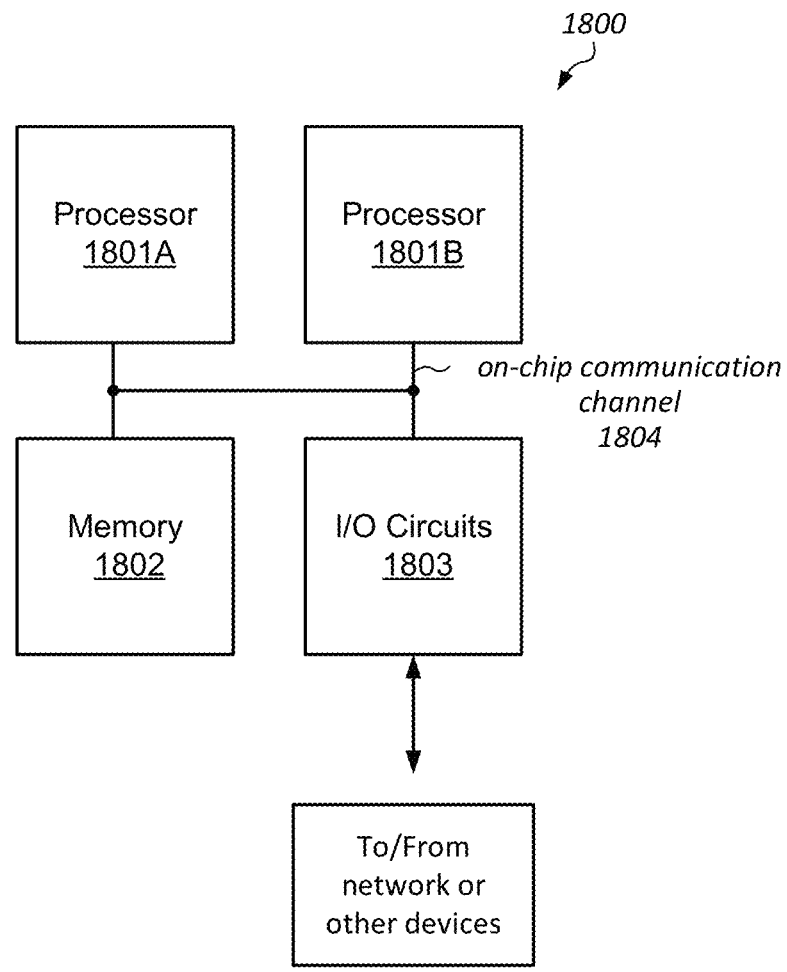
FIG. 18 is a block diagram of an integrated circuit, according to some embodiments.

FIG. 18—Block Diagram of Integrated Circuit

A block diagram of an integrated circuit configured to execute program instructions for analyzing seismic survey data is illustrated in FIG. 18. In the illustrated embodiment, the integrated circuit 1800 includes a processor 1801A and processor 1801B, coupled to memory 1802, and I/O circuits 1803 via on-chip communication channel 1804. In various embodiments, integrated circuit 1800 may be configured for use in a desktop computer, server, or in a mobile computing application such as, e.g., a tablet or laptop computer.

Processors 1801A and 1801B may, in various embodiments, be representative of a general-purpose processor that performs computational operations. For example, processors 1801A and 1801B may be a central processing unit (CPU) such as a microprocessor, a microcontroller, an application-specific integrated circuit (ASIC), or a field-programmable gate array (FPGA). In some embodiments, processors 1801A and 1801B may execute program instructions, which may be stored in memory 1802 to perform various computational tasks, such as any of the techniques described above in regard to analyzing seismic survey data.

Memory 1802 may include any suitable type of memory such as a Dynamic Random Access Memory (DRAM), a Static Random Access Memory (SRAM), a Read-only Memory (ROM), Electrically Erasable Programmable Read-only Memory (EEPROM), or a FLASH memory, for example. It is noted that in the embodiment of an integrated circuit illustrated in FIG. 18, a single memory is depicted. In other embodiments, any suitable number of memories may be employed.

I/O circuits 1803 may be configured to coordinate data transfer between integrated circuit 1800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O circuits 1803 may be configured to implement a version of Universal Serial Bus (USB) protocol or IEEE 1394 (FIREWIRE) protocol.

I/O circuits 1803 may also be configured to coordinate data transfer between integrated circuit 1800 and one or more devices (e.g., other computer systems or integrated circuits) coupled to integrated circuit 1800 via a network. In one embodiment, I/O circuits 1803 may be configured to perform the operations necessary to implement an Ethernet (IEEE 802.3) networking standard such as Gigabit Ethernet or 10-Gigabit Ethernet, for example, although it is contemplated that any suitable networking standard may be implemented. In some embodiments, I/O circuits 1803 may be configured to implement multiple discrete network interface ports.

It is noted that the embodiment depicted in FIG. 18 is merely an example. In other embodiments, different functional blocks and different configurations of functional blocks are possible and contemplated.

Figure 19:
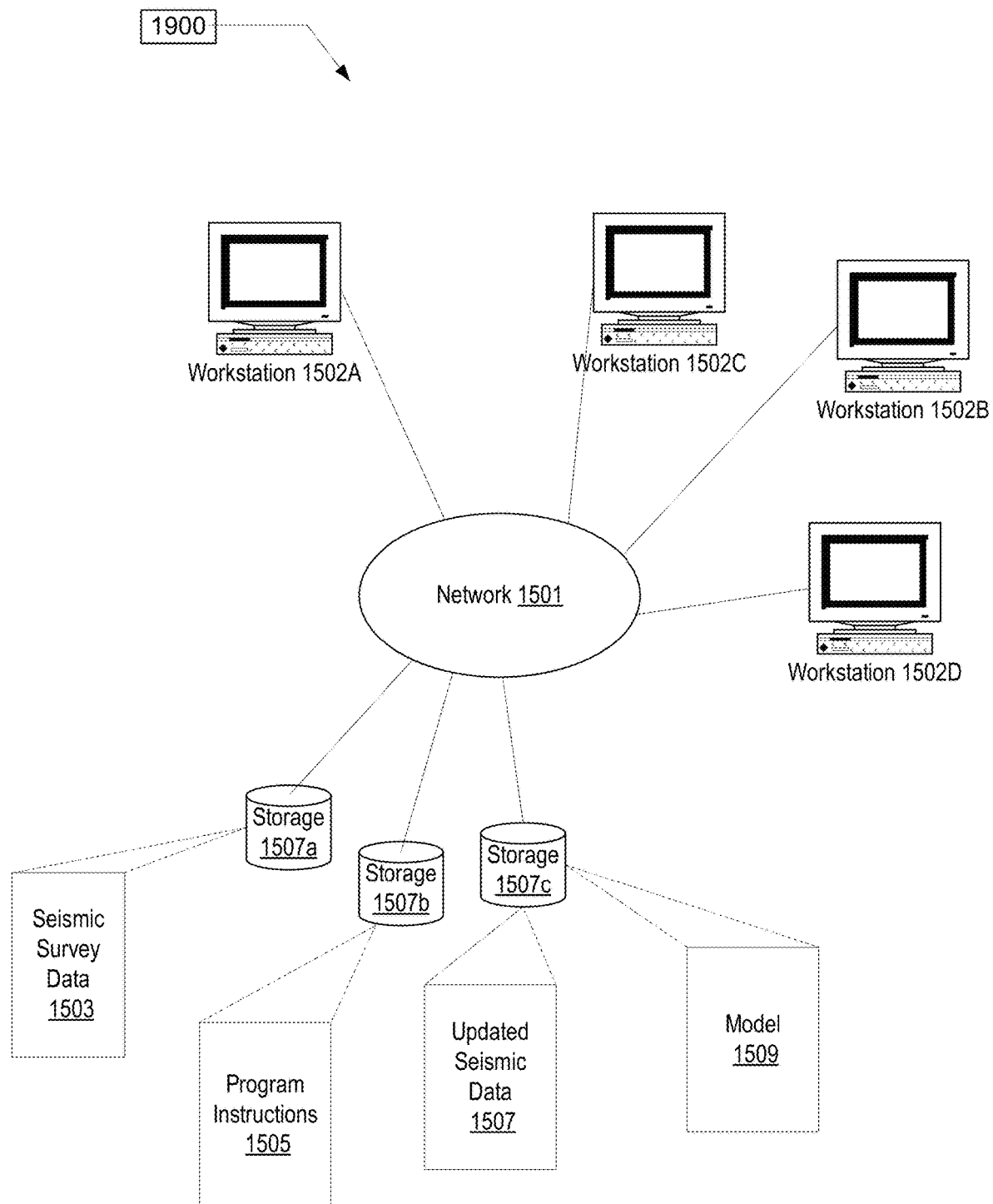
FIG. 19 is a block diagram illustrating an embodiment of a computing system, according to some embodiments.

FIG. 19—Block Diagram of Computer System

Turning to FIG. 19, a block diagram of one embodiment of a computer system for analyzing seismic survey data is illustrated. The computer system 1900 includes multiple workstations designated 1502A through 1502D. The workstations are coupled together through a network 1501 and to multiple storage devices designated 1507A through 1507C. In one embodiment, a given one of workstations 1502A-1502D may be representative of any standalone computing platform that may include, for example, one or more processors, local system memory including any type of random access memory (RAM) device, monitor, input output (I/O) means such as a network connection, mouse, keyboard, and the like (many of which are not shown for simplicity).

In one embodiment, storage devices 1507A-1507C may be representative of any type of non-transitory computer-accessible storage medium such as hard disk systems, optical media drives, tape drives, NVRAM disk storage, and the like. As such, program instructions included for processing seismic survey data may be stored within any of storage devices 1507a-1507c and loaded into the local system memory of any of the workstations during execution. As an example, as shown in FIG. 19, program instructions 1505 are shown stored within storage device 1507b.

In one embodiment, program instructions 1505 may be called by any of workstations 1502A-1502D. The program instructions may be executed directly from the storage device 1507b, or may be transferred to the local system memory in one of workstations 1502A-1502D for subsequent execution. In some cases, one or more processors included in a given workstation may execute program instructions 1505 may be distributed, or they may be executed in a distributed fashion among the workstations 1502A-D, as desired.

During execution of program instructions 1505, seismic survey data 1503 may be retrieved from storage device 1507a for analysis. As described above, seismic survey data 1503 may include data from one or more surveys, and may be processed or migrated to generate updated seismic data 1507, which may be stored on storage device 1507c. As part of the execution of program instructions 1505, sub-surface model 1507 may be generated and stored in storage device 1507c, for later retrieval and use.

It is noted that the embodiment depicted in FIG. 19 is merely an example. In other embodiments, different numbers of workstations and storage devices may be employed, as well as different storage locations for seismic survey data 1503, program instructions 1505, updated seismic data 1507, and sub-surface model 1509.

In some embodiments, any of various operations discussed herein may be performed by executing program instructions stored on a non-transitory computer readable medium. Such program instructions may be executed using one or more of device 110, device 120, and/or authorization system 150, for example. In these embodiments, the non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method of manufacturing a geophysical data product, the method comprising:
    accessing a representation of an up-going pressure wavefield and a down-going pressure wavefield;
    determining a warping attribute based at least in part on a difference between the up-going pressure wavefield and the down-going pressure wavefield;
    determining a pseudo down-going pressure wavefield based on the up-going pressure wavefield and the warping attribute; and
    using the pseudo down-going pressure wavefield to generate a modified record of geophysical data, wherein the warping attribute enables the pseudo down-going pressure wavefield to be generated from the up-going pressure wavefield without persistently storing a record of the down-going pressure wavefield, thereby reducing computational resources required to generate the modified record of geophysical data; and
    storing the modified record of geophysical data on a non-transitory computer readable memory medium, thereby completing the manufacture of the geophysical data product.

2. The method of claim 1, wherein the warping attribute is multi-dimensional.

3. The method of claim 2, wherein the warping attribute comprises a time dimension, a channel number on a streamer dimension, and a streamer number dimension.

4. The method of claim 1, wherein using the pseudo down-going pressure wavefield to generate the modified record of geophysical data comprises imaging subsurface structure using separated wavefields.

5. The method of claim 1, wherein using the pseudo down-going pressure wavefield to generate the modified record of geophysical data comprises performing multiple prediction.

6. The method of claim 1, further comprising:
    prior to determining the pseudo down-going pressure wavefield, performing pre-conditioning on the up-going pressure wavefield without performing pre-conditioning on the down-going pressure wavefield, wherein determining the pseudo down-going pressure wavefield based on the up-going pressure wavefield reflects the pre-conditioning.

7. The method of claim 1, further comprising:
applying an obliquity correction with acoustic scaling to the pseudo down-going pressure wavefield to obtain a pseudo down-going particle motion wavefield; and
using the pseudo down-going particle motion wavefield to perform geophysical data calculations.

8. A computer system configured to generate a noise-reduced image of subsurface geology from seismic data, the computer system comprising:
one or more processors;
a non-transitory computer readable memory medium;
wherein the one or more processors are configured to execute instructions stored on the non-transitory computer readable memory medium to implement:
means for receiving an up-going pressure wavefield and a down-going pressure wavefield, wherein the pressure wavefields comprise seismic data received from a seismic data acquisition system located beneath a free-surface of a body of water;
means for determining a warping attribute based at least in part on a difference between the up-going pressure wavefield and the down-going pressure wavefield;
means for determining a pseudo down-going pressure wavefield based on the up-going pressure wavefield and the warping attribute;
generation of a modified record of geophysical data using the pseudo down-going pressure wavefield; and
storage of a modified record of geophysical data on a non-transitory computer readable memory medium, thereby generating the noise-reduced image of subsurface geology.

9. The computer system of claim 8, wherein the warping attribute is a multidimensional warping attribute comprising a time dimension, a channel number on a streamer dimension, and a streamer number dimension.

10. The computer system of claim 8, wherein the instructions are further executable to:
prior to determining the pseudo down-going pressure wavefield, perform pre-conditioning on the up-going pressure wavefield without performing pre-conditioning on the down-going pressure wavefield, wherein determining the pseudo down-going pressure wavefield based on the up-going pressure wavefield reflects the pre-conditioning.

11. The computer system of claim 8, wherein the instructions are further executable to:
apply an obliquity correction to the pseudo down-going pressure wavefield to obtain a pseudo down-going particle motion wavefield; and
use the pseudo down-going particle motion wavefield to perform geophysical data calculations.

12. The computer system of claim 8, wherein the warping attribute comprises a time shift for each of a plurality of samples and each of a plurality of traces associated with the up-going and down-going pressure wavefields.

13. The computer system of claim 8, wherein the up-going pressure wavefield and the down-going pressure wavefield are obtained from a pressure wavefield detected by receivers of a seismic data-acquisition system.

14. The computer system of claim 8, wherein the instructions are further executable to compare a magnitude of the warping attribute to a predetermined threshold; and
wherein, based on a determination that the magnitude of the warping attribute is less than the predetermined threshold, the means for determining the pseudo down-going pressure wavefield outputs the up-going pressure wavefield as the pseudo down-going pressure wavefield without applying the warping attribute.

15. A non-transitory computer-readable memory medium storing program instructions which, when executed by a processor of a computer system, cause the computer system to at least:
access a representation of a down-going pressure wavefield and an up-going pressure wavefield;
determine a warping attribute based at least in part on a difference between the down-going pressure wavefield and the up-going pressure wavefield;
determine a pseudo up-going pressure wavefield based on the down-going pressure wavefield and the warping attribute;
use the pseudo up-going pressure wavefield to generate a modified record of geophysical data; and
store the modified record of geophysical data on the non-transitory computer-readable memory medium.

16. The non-transitory computer-readable memory medium of claim 15, wherein the warping attribute is a multidimensional warping attribute comprising a time dimension, a channel number on a streamer dimension, and a streamer number dimension.

17. The non-transitory computer-readable memory medium of claim 15, wherein the program instructions are further executable to cause the computer system to:
prior to determining the pseudo up-going pressure wavefield, perform pre-conditioning on the down-going pressure wavefield without performing pre-conditioning on the up-going pressure wavefield, wherein determining the pseudo up-going pressure wavefield based on the down-going pressure wavefield reflects the pre-conditioning.

18. The non-transitory computer-readable memory medium of claim 15 wherein the program instructions are further executable to cause the computer system to:
apply an obliquity correction to the pseudo up-going pressure wavefield to obtain a pseudo up-going particle motion wavefield; and
use the pseudo up-going particle motion wavefield to perform geophysical data calculations.

19. The non-transitory computer-readable memory medium of claim 15, wherein the warping attribute comprises a time shift for each of a plurality of samples and each of a plurality of traces associated with the up-going and down-going pressure wavefields.

20. The non-transitory computer-readable memory medium of claim 15, wherein the up-going pressure wavefield and the down-going pressure wavefield are obtained from a pressure wavefield detected by receivers of a seismic data-acquisition system.

21. The non-transitory computer-readable memory medium of claim 15, wherein the program instructions are further executable to cause the computer system to compare a magnitude of the warping attribute to a predetermined threshold; and
wherein to determine the pseudo up-going pressure wavefield, based on a determination that the magnitude of the warping attribute is less than the predetermined threshold, the program instructions are further executable to output the down-going pressure wavefield as the pseudo up-going pressure wavefield without applying the warping attribute.

* * * * *